US008102679B2

(12) United States Patent
Gong et al.

(10) Patent No.: US 8,102,679 B2
(45) Date of Patent: Jan. 24, 2012

(54) UTILIZATION OF A MULTIFUNCTIONAL PIN TO CONTROL A SWITCHED-MODE POWER CONVERTER

(75) Inventors: Xiaowu Gong, Chao Chu Kang (SG); Siu Kam Kok, Singapore (SG); Yi He, Sembawang (SG); Tuck Meng Chan, Woodlands (SG)

(73) Assignee: Infineon Technologies AG, Villach (AT)

( * ) Notice: Subject to any disclaimer, the term of this patent is extended or adjusted under 35 U.S.C. 154(b) by 315 days.

(21) Appl. No.: 12/192,399

(22) Filed: Aug. 15, 2008

(65) Prior Publication Data

US 2010/0039836 A1 Feb. 18, 2010

(51) Int. Cl.
*H02M 3/335* (2006.01)
(52) U.S. Cl. .................. 363/21.12; 363/21.04
(58) Field of Classification Search ............... 363/21.12, 363/21.13, 21.16, 21.17, 21.18, 21.04, 21.05, 363/21.08, 21.09, 21.1
See application file for complete search history.

(56) References Cited

U.S. PATENT DOCUMENTS

| | | | |
|---|---|---|---|
| 4,677,366 A | 6/1987 | Wilkinson et al. | |
| 5,757,635 A | 5/1998 | Seong | |
| 5,798,635 A | 8/1998 | Hwang et al. | |
| 6,008,590 A | 12/1999 | Giannopoulos et al. | |
| 6,191,566 B1 | 2/2001 | Petricek et al. | |
| 6,252,783 B1* | 6/2001 | Huh et al. .................. | 363/21.01 |
| 6,304,462 B1 | 10/2001 | Balakrishnan et al. | |
| 6,437,547 B2 | 8/2002 | Petricek et al. | |
| 7,012,819 B2* | 3/2006 | Feldtkeller .................. | 363/21.01 |
| 7,030,596 B1* | 4/2006 | Salerno et al. .............. | 323/282 |
| 7,233,131 B2 | 6/2007 | Lin et al. | |
| 7,339,359 B2 | 3/2008 | Choi et al. | |
| 7,529,105 B1* | 5/2009 | Choi et al. .................. | 363/21.12 |
| 7,639,516 B2* | 12/2009 | Usui et al. .................. | 363/21.12 |
| 7,821,237 B2* | 10/2010 | Melanson ..................... | 323/222 |
| 2003/0156433 A1* | 8/2003 | Gong et al. ..................... | 363/18 |
| 2005/0219872 A1* | 10/2005 | Lys .............................. | 363/21.04 |
| 2008/0043504 A1* | 2/2008 | Ye et al. ........................ | 363/97 |
| 2008/0130324 A1* | 6/2008 | Choi et al. .................. | 363/21.03 |
| 2008/0175029 A1* | 7/2008 | Jung et al. ...................... | 363/79 |
| 2009/0160422 A1* | 6/2009 | Isobe et al. .................. | 323/349 |

FOREIGN PATENT DOCUMENTS

WO WO 01/18566 A1 3/2001

OTHER PUBLICATIONS

Infineon Technologies AP, "ICE3Axxx/ICE3Bxxx—CoolSET F3 Design Guide," Application Note, V1.0, Aug. 2004, pp. 1-17.

(Continued)

*Primary Examiner* — Adolf Berhane
*Assistant Examiner* — Emily Pham
(74) *Attorney, Agent, or Firm* — Slater & Matsil, L.L.P.

(57) ABSTRACT

An embodiment of the invention relates to a power converter including a resistor divider with an internal node to sense an input line voltage. The internal node is operable as a multifunctional pin. A controller compares a feedback voltage dependent on a power converter output characteristic to a current-sense signal including an offset dependent on a voltage of the internal node to control entry and exit of the power converter from burst mode operation. The node may be employed to manage power converter operation by sensing or controlling its voltage to signal operation in a standby or burst mode, to sense the input line voltage, to enable an external system to signal shutdown to the power converter, and to enable the power converter to signal a delayed restart condition to the external system.

23 Claims, 33 Drawing Sheets

OTHER PUBLICATIONS

Infineon Technologies AP, "ICE3A/BS02 Current Mode Controller with integrated 500V Startup Cell," Application Note, Ver1.0, 0504, Date Unknown, pp. 1-17.

Infineon Technologies AG, "CoolSET™ F3 Family—ICE3XXXXX Series," 2004, 2 pgs.

STMicroelectronics, "L6599—High-voltage resonant controller," Jul. 2006, pp. 1-36.

Texas Instruments, "TL431, TL431A, TL431B, TL432, TL432A, TL432B—Adjustable Precision Shunt Regulators," Various Dates, 67 pgs.

Semiconductor Component Industries, LLC, ON Semiconductor, "NCP1395A/B—High Performance Resonant Mode Controller," Rev. 1, Mar. 2006, pp. 1-27.

Power Integrations, Inc."TOP232-234—TOPSwitch®-FX Family—Design Flexible, EcoSmart®, Integrated Off-line Switcher," Jul. 2001, pp. 1-36.

Qiu, D.-Y., et al.; "Single Current Sensor Control for Single-Phase Active Power Factor Correction"; IEEE Transactions on Power Electronics, vol. 17, No. 5, Sep. 2002; pp. 623-632.

NCP 1606 "Cost Effective Power Factor Controller"; Semiconductor Components Industries, LLC, Nov. 2007—Rev. 5; Publication Order No. NCP1606/D; pp. 1-22.

Todd, P. C.; UC3854 "Controlled Power Factor Correction Circuit Design"; Unitrode Application Note U-134; pp. 3-269-3-289.

Hwang, J., et al.; "New Universal Control Methods for Power Factor Correction and DC to DC Converter Applications"; Applied Power Electronics Conference and Exposition, 1997, APEC '97 Conference Proceedings 1997, Twelfth Annual; vol. 1, Feb. 23-27, 1997 pp. 59-65 vol. 1.

* cited by examiner

UTILIZATION OF A MULTIFUNCTIONAL PIN TO CONTROL A SWITCHED-MODE POWER CONVERTER

TECHNICAL FIELD

An embodiment of the invention relates generally to electronic power conversion and methods, and more particularly to the use of a circuit node to control a switched-mode power converter.

BACKGROUND

A switched-mode power converter (also referred to as a "power converter" or "regulator") is a power supply or power processing circuit that converts an input voltage waveform into a specified output voltage waveform. DC-DC power converters convert a dc input voltage into a dc output voltage. Controllers associated with the power converters manage an operation thereof by controlling the conduction periods of switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of the switches of the power converter. The duty cycle is a ratio represented by a conduction period of a switch to a switching period thereof. Thus, if a switch conducts for half of the switching period, the duty cycle for the switch would be 0.5 (or 50%). Additionally, as voltage or current for systems, such as a microprocessor powered by the power converter, dynamically change (e.g., as a computational load on a load microprocessor changes), the controller should be configured to dynamically increase or decrease the duty cycle of the switches therein to maintain an output characteristic such as an output voltage at a desired value.

In an exemplary application, the power converters have the capability to convert an unregulated input voltage, such as 12 volts, supplied by an input voltage source to a lower, regulated, output voltage, such as 2.5 volts, to power a load. To provide the voltage conversion and regulation functions, the power converters include active power switches such as metal-oxide semiconductor field-effect transistors ("MOSFETs") that are coupled to the voltage source and periodically switch a reactive circuit element such as an inductor or the primary winding of a transformer to the voltage source at a switching frequency that may be on the order of 500 kHz or higher.

A conventional way to regulate an output characteristic of a switched-mode power converter, such as output voltage, is to sense a current in an inductive circuit element such as an output inductor in a forward converter topology or a transformer primary winding in a forward or flyback converter topology, and compare the sensed current with a threshold current level to control a duty cycle of the power converter. The threshold current level is generally set by an error amplifier coupled to a circuit node such as an output terminal of the power converter to regulate the output characteristic. The mechanism to control duty cycle is a signal to turn a power switch "on" or "off."

A feedback circuit structure wherein a duty cycle of the power converter is controlled by sensing a current in an inductive circuit element and comparing the sensed current to a threshold level that is controlled by an error amplifier is generally referred to as current-mode control. An alternative feedback circuit structure is generally referred to as voltage-mode control wherein a duty cycle of the power converter is controlled by comparing a sawtooth waveform generated by an oscillator to a threshold voltage level controlled by an error amplifier.

In view of the broad application of switched-mode power converters in electronic devices, an area of growing environmental concern is the level of power dissipation produced by a power converter under a no-load or a light-load operating condition. It is generally recognized that power conversion efficiency of a switched-mode power converter at a no-load or a light-load operating condition is substantially lower than its power conversion efficiency at higher load levels.

A design approach to increase power conversion efficiency at a no-load or a light-load operating condition employs an active "burst mode" to control the switching action of a power switch in the power converter. A switched-mode power converter may temporarily disable the switching action of a power switch in a burst mode to reduce switching losses in semiconductor devices and in reactive circuit elements such as inductors and capacitors.

A power converter employing burst mode operation can be designed with a burst mode operational profile based on a feedback voltage. For example, power converter controller ICE3A/ICE3B produced by Infineon Technologies and described in Application Note entitled "ICE3Axxx/ICE3Bxxx CoolSET™ F3 Design Guide," V1.0, dated August 2004, which is hereby referenced and incorporated herein, describes entering and exiting an active burst mode based on a feedback signal $V_{FB}$ in a control loop. The feedback signal $V_{FB}$ is produced by an error amplifier in the controller that compares an output characteristic of a power converter, such as output voltage, to a reference output voltage value.

The general operation of this controller including entry and exit from an active burst mode can be described as follows: The controller provides an active burst mode function at no-load or light-load conditions to enable the system to achieve low standby power, for example, a standby power less than 100 mW. Active burst mode refers to a controller operating in an active state that can quickly respond to a change in the feedback signal, $V_{FB}$.

Using a current-mode control scheme, the feedback signal $V_{FB}$ is employed to control power delivery to the output of the power converter. When the output load power is reduced, the voltage of the feedback signal $V_{FB}$ drops. If the feedback signal $V_{FB}$ stays below 1.32 V for a sufficient period of time, the controller enters burst mode operation. The ICE3A/ICE3B controller operates in a burst mode for the feedback signal $V_{FB}$ lying in the range 3.4 V to 4.0 V. When $V_{FB}$ is greater than 4.0 V, the controller switches on, using a current limitation corresponding to 0.25 V across a current-sense resistor in the power converter. When $V_{FB}$ is less than 3.4 V, the controller switches off, and controller current consumption is greatly reduced. The controller quickly leaves burst mode operation and operates normally, i.e., with an uninterrupted duty cycle, when $V_{FB}$ is greater than 4.8 V.

A design issue for power converters employing burst mode operation is to provide uniform entry and exit conditions, i.e., a relatively uniform output power level, for entering the burst mode over a wide range of input voltages to the power converter. For example, a power converter designed to operate from ac mains is frequently designed to operate over a range of ac line input voltages that spans 85 V to 265 V RMS. Under a light-load operating condition, a power converter may not enter a burst mode for low ac line voltages, and the burst mode exiting conditions are thus not uniform over a range of output power. Accurate control of entry and exit from burst mode operation is important to an end customer, for example, due to acoustic noise that can be generated by a power converter operating in a burst mode.

In current-mode control, two feedback loops can usually be identified. In one feedback loop, referred to as the inner current feedback loop, the sensed current is compared with a threshold current level. A second feedback loop, referred to as the outer voltage feedback loop, provides the threshold current level with an error amplifier that senses an output characteristic of the power converter, such as an output voltage. The inner current feedback loop generally becomes unstable in a continuous current mode ("CCM") of operation when duty cycle increases beyond 50%, regardless of the stability of the outer voltage feedback loop. CCM refers to uninterrupted current flow in an inductor such as an output inductor over a switching period of the power converter. The inner current feedback loop does not become unstable as duty cycle is increased in a discontinuous current mode ("DCM") of operation. Many power converter designs would suffer serious limitations if duty cycle greater than 50% was not allowed. The stability of the inner current feedback loop is dependent on the slope of the sensed current versus time. By injecting a small amount of slope compensation into the inner current feedback loop, stability of this loop results for all values of duty cycle.

A related design issue for power converters is the number of pins (physical circuit nodes) that is required for power converter control and for interactions with external system elements. For example, a plurality of pins is generally required to manage power converter operation in a burst mode, to sense an input line voltage, to enable an external system to signal shutdown to the power converter, to enable a power converter to signal a delayed restart condition to an external system, etc. The utilization of a plurality of external pins to provide these functions incurs physical space and cost in a power converter design.

Thus, there is a need for a process and related method to provide control of entry into and exit from a burst mode in a switched-mode power converter and to provide control of a power converter with a minimal number of pins that avoids the disadvantages of conventional approaches.

SUMMARY OF THE INVENTION

In accordance with an exemplary embodiment, a power converter and a related method are provided. In an embodiment, the power converter employs a threshold voltage and a voltage offset dependent on an input voltage sensed at a circuit node to control entry into and exit from standby or burst mode operation. In an embodiment, the power converter further includes a current-sense circuit element configured to produce a current-sense signal dependent on a current in a circuit element of the power converter such as an inductor. The power converter asserts a burst mode signal when the current-sense signal crosses the threshold voltage including adjustment for the offset. In an embodiment, the threshold voltage is dependent on an output characteristic of the power converter. In an embodiment, the power converter includes a controller configured to employ the current sense signal to control a duty cycle of a power switch of the power converter. In an embodiment, the controller terminates the duty cycle of the power switch in response to the current-sense signal exceeding the feedback voltage with adjustment for the offset.

In a further embodiment, a power converter includes a power switch and a resistor-divider network coupled to an input line of the power converter, the resistor-divider network including a plurality of resistors coupled in series to form an internal circuit node. In an embodiment, a controller is coupled to the power switch and to the node, and the controller is configured to shut down the power converter if a voltage of the node is less than a first voltage threshold, a brownout signal if the voltage of the node is greater than the first voltage threshold and less than a second voltage threshold, and a line voltage feedforward signal if the voltage of the node is greater than the second voltage threshold. In an embodiment, the controller is further configured to increase the voltage of the node to a voltage greater than the second voltage threshold if the power converter is operating in standby or burst mode. In an embodiment, the controller is further configured to disable the power converter in response to assertion of the brownout signal. In an embodiment, the controller is further configured to signal a delayed restart condition of the power converter to an external circuit by alternately perturbing the voltage of the node. In a further embodiment, a capacitor is coupled to the node, and the controller is configured to alternately perturb the voltage of the node at a frequency dependent on a capacitance of the capacitor.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be redescribed in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

Figure 1:
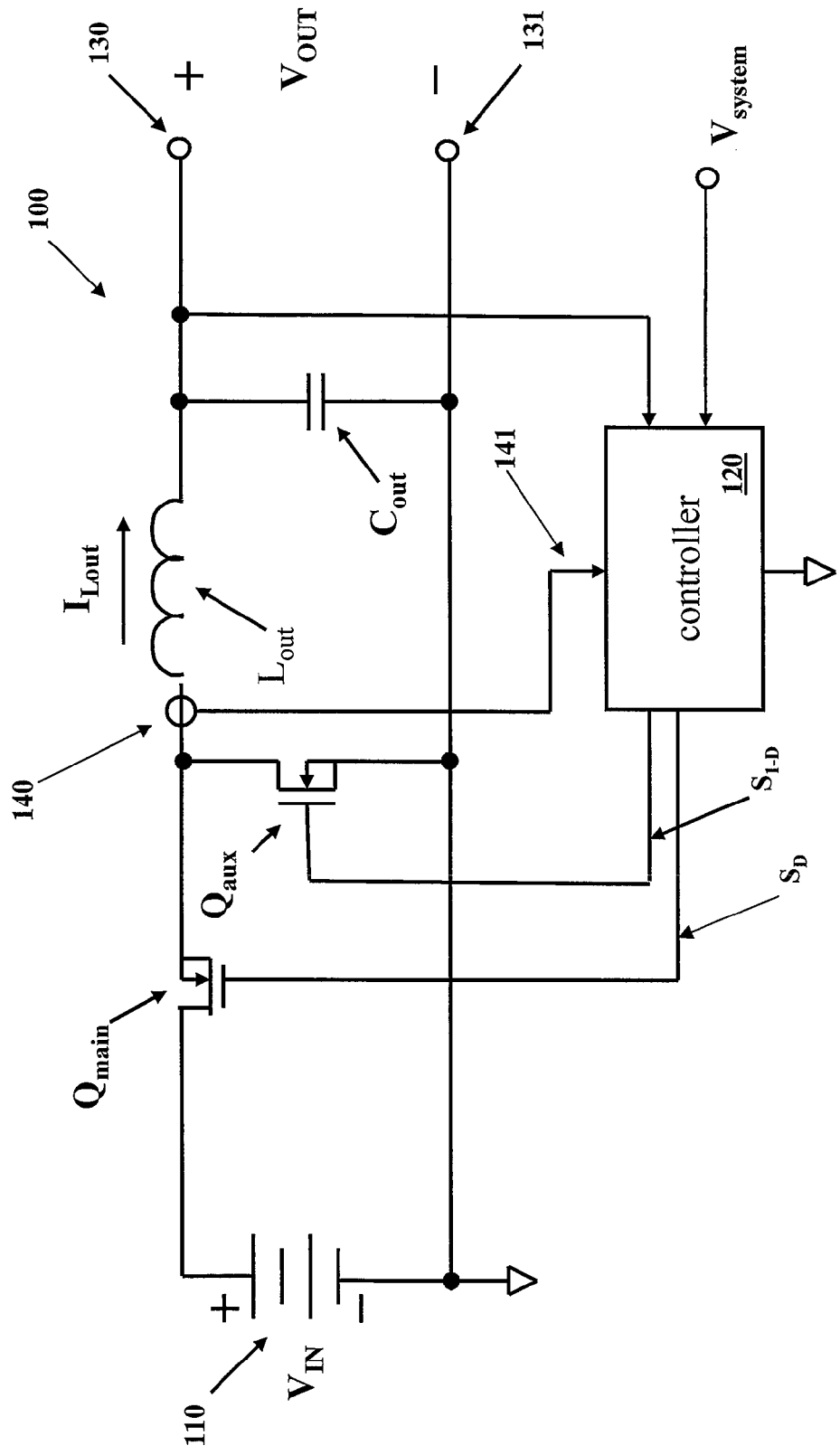
FIGS. 1, 2, and 3 illustrate schematic drawings of a power train and a controller of a power converter, constructed according to exemplary embodiments.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a switched-mode power converter including a power converter controller with a threshold voltage dependent on an input voltage present at a circuit node such as an external pin to control entry into and exit from standby or burst mode operation employing a current sensing means for a current in an inductive circuit element. In an alternative embodiment, current in a power switch is sensed. Distinction between various circuit elements wherein a current is sensed will not be made in further descriptions herein.

A characteristic of a conventional power converter controller that compromises accurate control of entry and exit from burst mode operation is an overshoot problem associated with controlling power converter duty cycle. Employing an adjustable threshold voltage that can be sensed at a circuit node such as an external pin to enter and exit burst mode operation advantageously provides more uniform control of an operational condition such as an output power level of the power converter over a range of input voltages and load currents.

The present invention will be further described with respect to exemplary embodiments in a specific context wherein a circuit node such as an external pin is utilized to control a plurality of power converter operations. For example, and without limitation, a circuit node such as an external pin can be employed to manage power converter operation in a standby or burst mode, to sense an input line voltage, to enable an external system to signal shutdown to the power converter, and to enable the power converter to signal a delayed restart condition to an external system. A standby mode signaling function, an external shutdown signaling function, a line input voltage feedforward function, and a brownout sensing function can be conventionally performed by employing a plurality of external pins. As introduced herein, these functions are performed using one pin, i.e., one circuit node, relying on unique characteristics of these functions, thereby reducing the cost of a power converter and the system in which it is employed.

An embodiment of the invention may be applied to various electronic power conversion devices, for example, to a power converter to produce a regulated output voltage from an unregulated input voltage. Other electronic power conversion devices can be constructed using an adjustable threshold voltage to enter into and exit from burst mode operation and to use a multifunctional pin as introduced herein in different contexts using inventive concepts described herein, for example, a power amplifier or a motor controller applied in a communications or an industrial environment.

Referring initially to FIG. 1, illustrated is a simplified schematic diagram of an embodiment of a power train 100 of a switched-mode power converter to illustrate the operation thereof. The power converter includes a controller 120 that regulates a power converter output characteristic such as an output voltage. The power converter provides power to a system/load (not shown) coupled to output terminals 130 and 131. While in the illustrated embodiment the power train employs a buck converter topology, those skilled in the art should understand that other converter topologies such as a flyback topology or an isolated forward topology are well within the broad scope of the present invention.

The power train of the power converter receives an input voltage $V_{IN}$ from a source of electrical power (represented by battery 110) at an input thereof and provides a regulated output voltage $V_{OUT}$ or other output characteristic at output terminals 130 and 131. The input voltage $V_{IN}$ may be produced from an ac line input voltage employing a rectifier arrangement, and may include a power factor correction (PFC) switched-mode boost circuit, using techniques well known in the art. In keeping with the principles of a buck converter topology, the output voltage $V_{OUT}$ is generally less than the input voltage $V_{IN}$ such that a switching operation of the power converter can regulate the output voltage $V_{OUT}$.

During a first portion D of a high-frequency switching cycle, the power switch $Q_{main}$ is enabled to conduct in response to a gate drive signal $S_D$ for a primary interval, coupling the input voltage $V_{IN}$ to an output filter inductor $L_{out}$. During the first portion D of the switching cycle, an inductor current $I_{Lout}$ flowing through the output filter inductor $L_{out}$ increases as current flows from the input to the output of the power train. An ac component of the inductor current $I_{Lout}$ is filtered by the output capacitor $C_{out}$.

During a second portion 1-D of the switching cycle, the power switch $Q_{main}$ is transitioned to a non-conducting state, and an auxiliary power switch $Q_{aux}$ (e.g., an n-channel MOSFET), coupled to the output filter inductor $L_{out}$, is enabled to conduct in response to a gate drive signal $S_{1-D}$. The auxiliary power switch $Q_{aux}$ provides a path to maintain continuity of inductor current $I_{Lout}$ flowing through the output filter inductor $L_{out}$. During the second portion 1-D of the switching cycle, the inductor current $I_{Lout}$ flowing through the output filter inductor $L_{out}$ decreases. In general, the duty cycle of the power switch $Q_{main}$ and the auxiliary power switch $Q_{aux}$ may be adjusted to regulate the output voltage $V_{out}$ of the power converter. Those skilled in the art should understand, however, that the conduction periods for the two power switches may be separated by a small time interval to avoid cross conduction therebetween, and beneficially to reduce the switching losses associated with the power converter.

The controller 120 of the power converter receives the output voltage $V_{OUT}$ of the power converter and a desired output characteristic such as a desired system voltage $V_{system}$. In addition, the controller 120 receives a signal 141 from a current sensing device 140 that senses a current in the inductor $L_{out}$. The current sensing device 140 can be constructed with a current sensing transformer or with a sense resistor and an operational amplifier using techniques well known in the art. The controller 120 controls conductivity of the power switch $Q_{main}$ with a duty cycle D.

In a switched-mode power converter, such as the buck power converter illustrated and described with reference to FIG. 1, the duty cycle D of the power switch $Q_{main}$ determines the steady-state ratio of a power converter output voltage $V_{OUT}$ to its input voltage $V_{in}$. In particular, for a buck power converter typology operating in a continuous conduction mode, the duty cycle D determines the ratio of output voltage to input voltage (ignoring certain losses within the power converter) according to equation (1):

$$D=V_{OUT}/V_{IN}. \qquad (1)$$

In an alternative power converter typology, such as a boost topology, the duty cycle may determine the ratio of output voltage to input voltage according to another equation.

Figure 2:
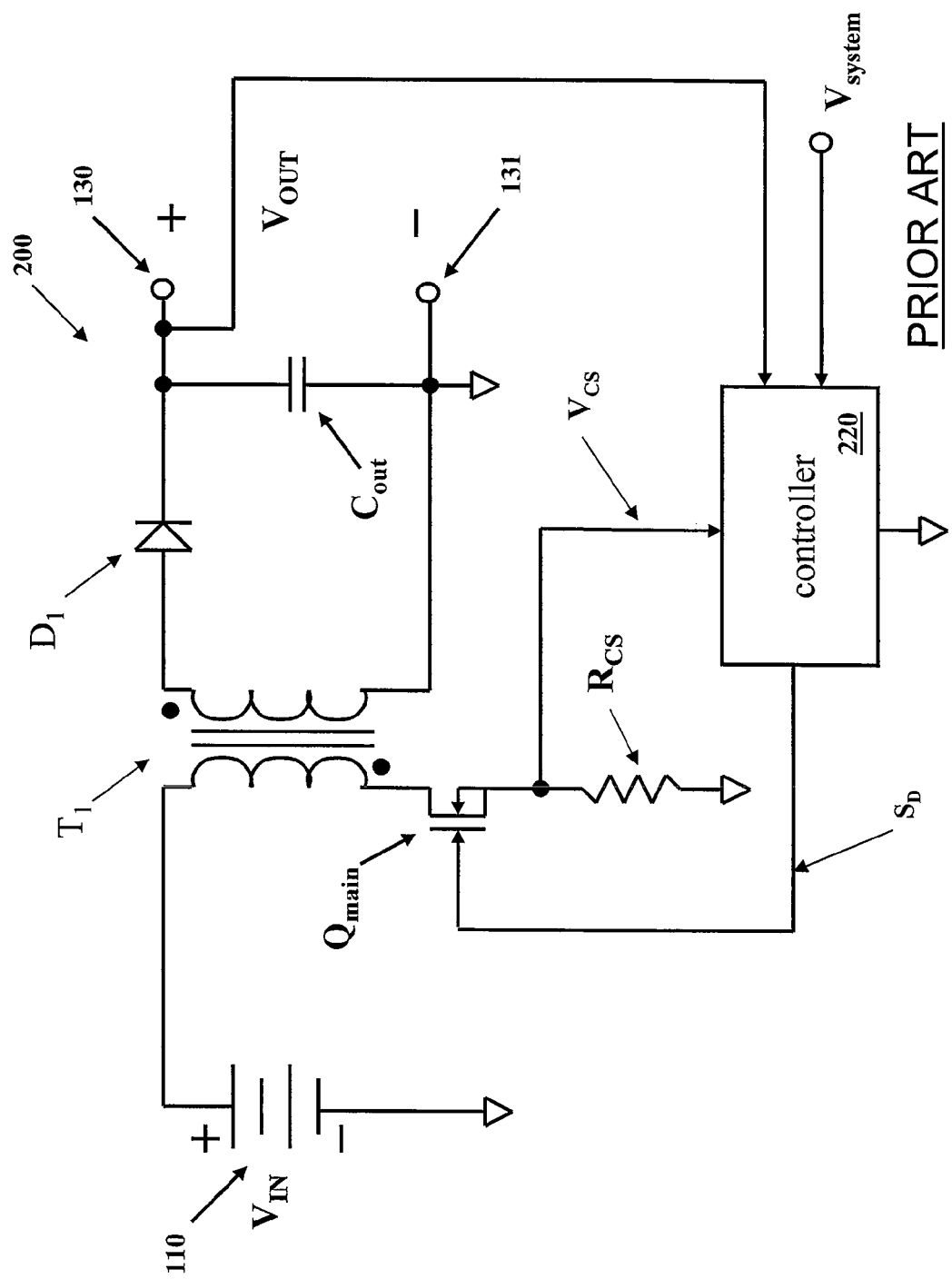

Turning now to FIG. 2, illustrated is a simplified schematic diagram of an embodiment of a flyback power train 200 of a switched-mode power converter to illustrate the operation thereof. The power train includes transformer $T_1$ coupled to the input voltage source 110 and to the power switch $Q_{main}$. Current-sense resistor $R_{CS}$ is coupled in series with the power switch $Q_{main}$ to sense a current therethrough to produce a current-sense signal $V_{CS}$. The secondary winding of the transformer $T_1$ is coupled to diode $D_1$, which in turn is coupled to output filter capacitor $C_{out}$. Though windings of the transformer $T_1$ are poled as indicated by the dots in the figure. Output voltage $V_{OUT}$ is produced at output terminals 130 and 131 with the indicated polarity in the figure. Controller 220 of the power converter receives the output voltage $V_{OUT}$ of the power converter and a desired output characteristic such as a desired system voltage $V_{system}$. The controller 220 receives the signal $V_{CS}$ from a current-sense resistor $R_{CS}$ that senses the current in the power switch $Q_{main}$. The controller 220 controls conductivity of the power switch $Q_{main}$ with a duty cycle D.

Figure 3:
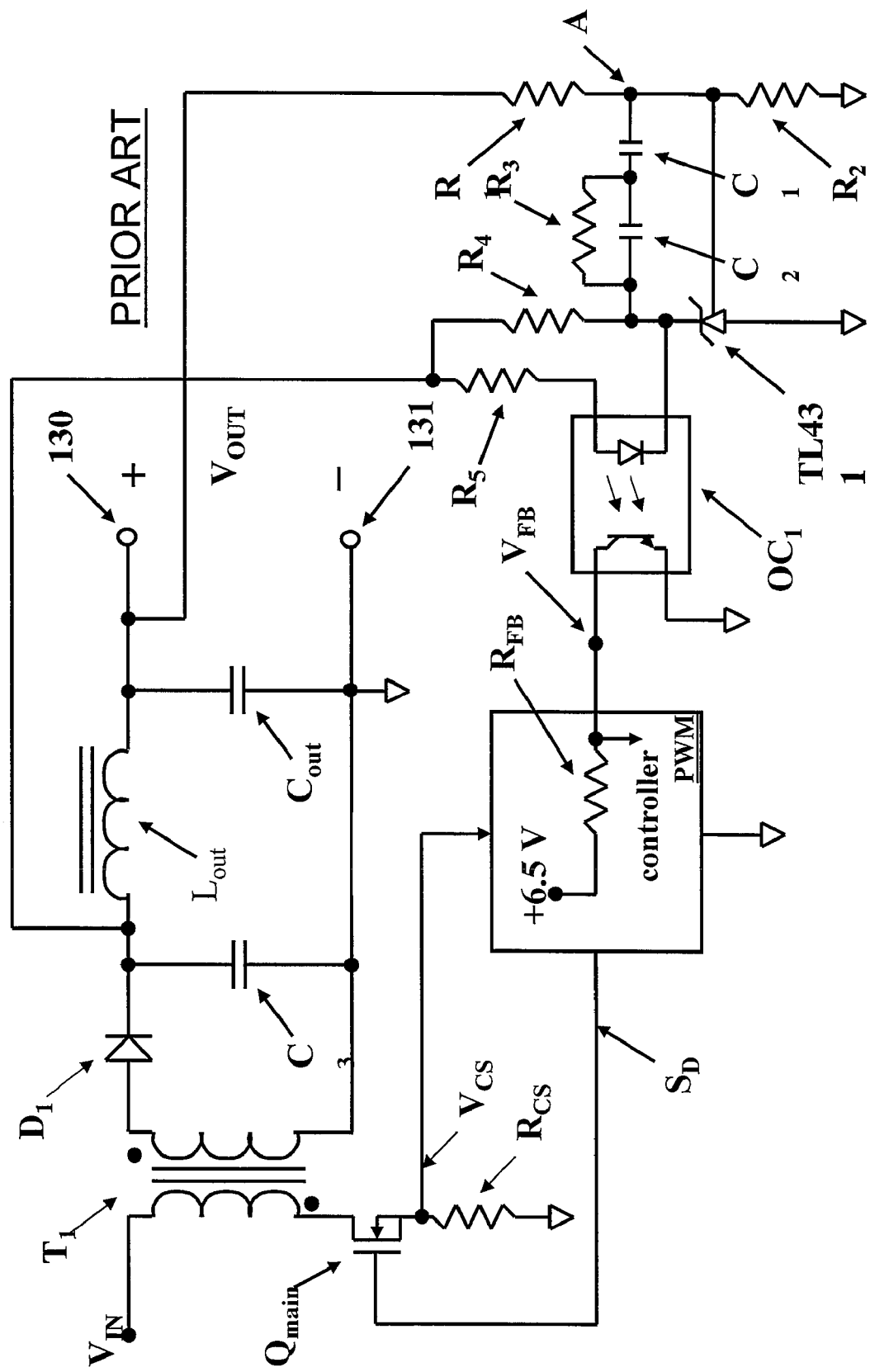

Turning now to FIG. 3, illustrated is a schematic drawing of an embodiment of a flyback power converter constructed with a controller illustrating the production of a feedback signal $V_{FB}$ by sensing an output characteristic of a power converter such as an output voltage. As illustrated in FIG. 3, resistors $R_1$ and $R_2$ coupled together at circuit node A form a voltage divider that senses the output voltage $V_{OUT}$. The noninverting input of operational amplifier TL431 is internally coupled to a 2.5 V reference voltage (not shown), and its external inverting input is coupled to voltage divider circuit node A. Operational amplifier TL431 is described in Texas Instruments' datasheet entitled "TL431 Adjustable Precision Shunt Regulator," dated December, 2005, which is hereby referenced and incorporated herein. Resistors $R_3$ and $R_4$ and capacitors $C_1$ and $C_2$ provide feedback gain and feedback loop stability. Resistance and capacitance values for these components are application dependent and can be selected using design techniques well known in the art.

Opto-coupler $OC_1$ operates as a current mirror, mirroring a sensed current in the secondary side of the power converter that flows through resistor $R_5$ to a current on the primary side of the power converter that flows through resistor $R_{FB}$ without a metallic connection therebetween. Resistor $R_{FB}$ in controller PWM is coupled to a reference voltage source, preferably to an internal 6.5V reference voltage source such as illustrated in FIG. 3.

A current-sense signal $V_{CS}$ produced by current flowing through sense resistor $R_{CS}$ provides a measure of current flowing through main power switch $Q_{main}$.

The resistor $R_{FB}$ coupled to a reference voltage source is coupled to an output terminal of opto-coupler $OC_1$ to produce a feedback voltage at the node $V_{FB}$ controlled by the output current from opto-coupler $OC_1$. When power converter output voltage is high, voltage divider circuit node A is correspondingly high. The output voltage of operational amplifier TL431 will be low and current flowing through resistor $R_5$ and the opto-coupler input diode will be high. The high opto-coupler input current is thus coupled to controller PWM. Current flowing through the resistor $R_{FB}$ causes the voltage at node $V_{FB}$ to be low. Alternatively, when the power converter output voltage is low, voltage divider circuit node A is low, the output of operational amplifier TL431 voltage is high, and current flowing through resistor $R_5$ and the opto-coupler input diode is low. The low opto-coupler input current is coupled to controller PWM, and due to the resistor $R_{FB}$, the voltage at node $V_{FB}$ will be high.

The flyback circuit illustrated in FIG. 3 includes a capacitor-inductor-capacitor output filter ($C_3$, $L_{out}$, $C_{out}$) to provide a further level of output filtering beyond that illustrated in FIG. 2 with the single output filter capacitor $C_{out}$.

Conventional design approaches to control entry and exit from standby or burst mode operation include adjusting threshold voltage levels. For example, the threshold voltage level for entering a standby or burst mode can be increased from 1.32 V to 1.50V, and the current-limiting threshold voltage can be increased from 0.25 V to 0.35 V during standby or burst mode operation. Recognizing that the power converter can enter standby or burst mode operation over a widely varying range of ac input voltages, for example, from 85 V to 265 V, merely adjusting a threshold voltage does not provide an adequate solution for a power converter that must also operate from substantially no load to full load.

Figure 4:
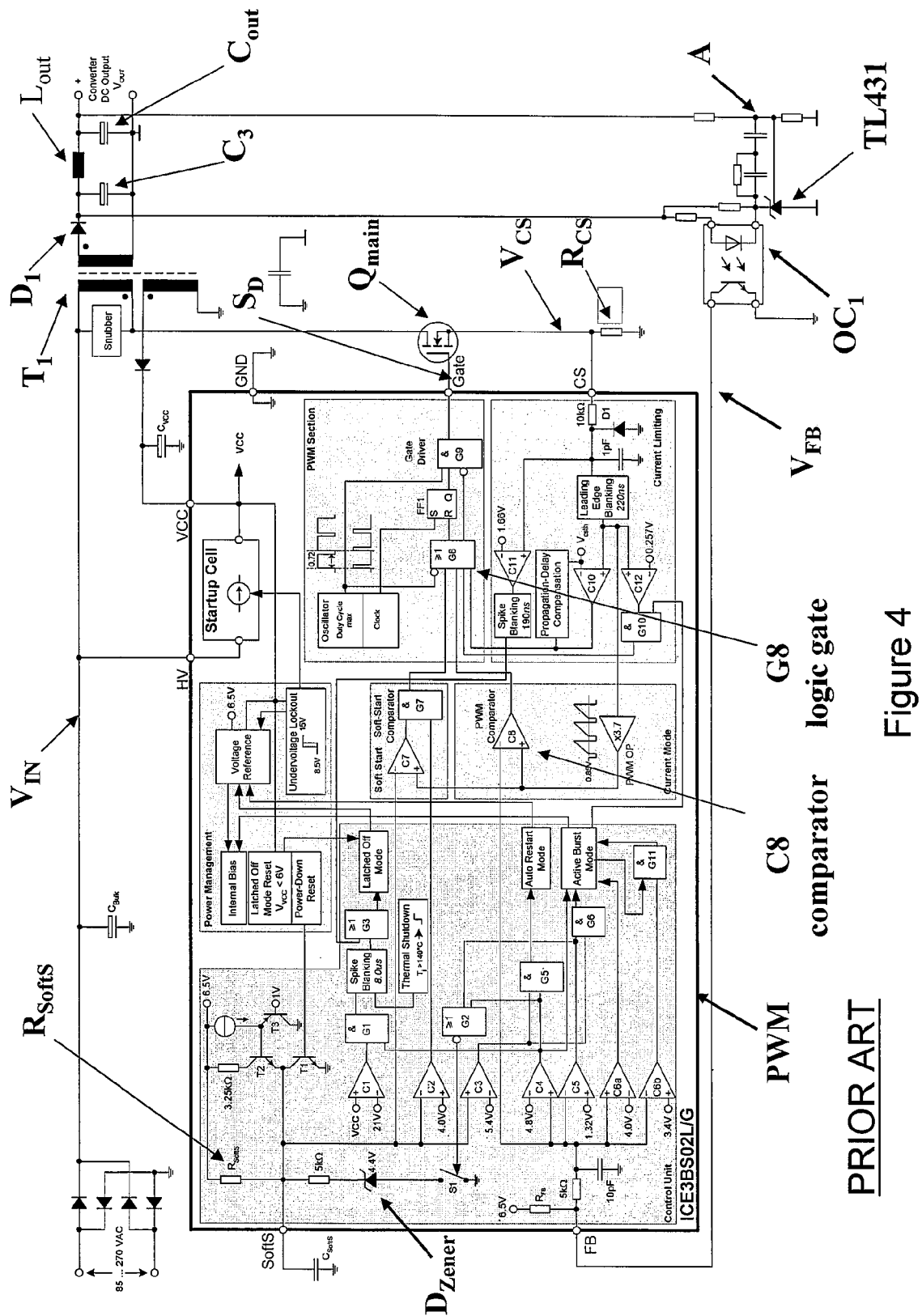
FIG. 4 illustrates a representative block diagram of an exemplary controller coupled to the power train of a flyback power converter.

Turning now to FIG. 4, illustrated is a representative block diagram of an exemplary CoolSET F3 controller PWM, produced by Infineon Technologies, coupled to the power train of a flyback power converter. Portions of FIG. 4 are reproduced from the ICE3Axxx/ICE3Bxxx CoolSET™ F3 Design Guide, previously cited. The power train includes the transformer $T_1$, power switch $Q_{main}$, diode $D_1$, and output capacitor $C_{out}$. The flyback power converter is operative as described with reference to the circuits illustrated in FIGS. 2, 3, and 4.

The output voltage $V_{OUT}$ is sensed with a resistor-divider network, operational amplifier TL431, and opto-coupler circuit $OC_1$ to produce the feedback signal $V_{FB}$. The feedback signal $V_{FB}$ is an input signal to the controller PWM.

The feedback voltage $V_{FB}$ is coupled to comparators, such as comparator C8, and logic gates, such as logic gate G8, and to other circuit elements to produce a control signal to control the gate of power switch $Q_{main}$. The operation of these circuit elements is well known in the art and will not be described herein in further detail.

The current-sense voltage $V_{CS}$ is produced across the resistor $R_{CS}$ by sensing current flowing through the primary winding of transformer $T_1$ and the power switch $Q_{main}$ to provide a second input signal at the node CS to the controller PWM.

The controller PWM illustrated in FIG. 4 includes a soft-start resistor $R_{SoftS}$ coupled to an internal 6.5 V bias voltage source.

Figure 5:
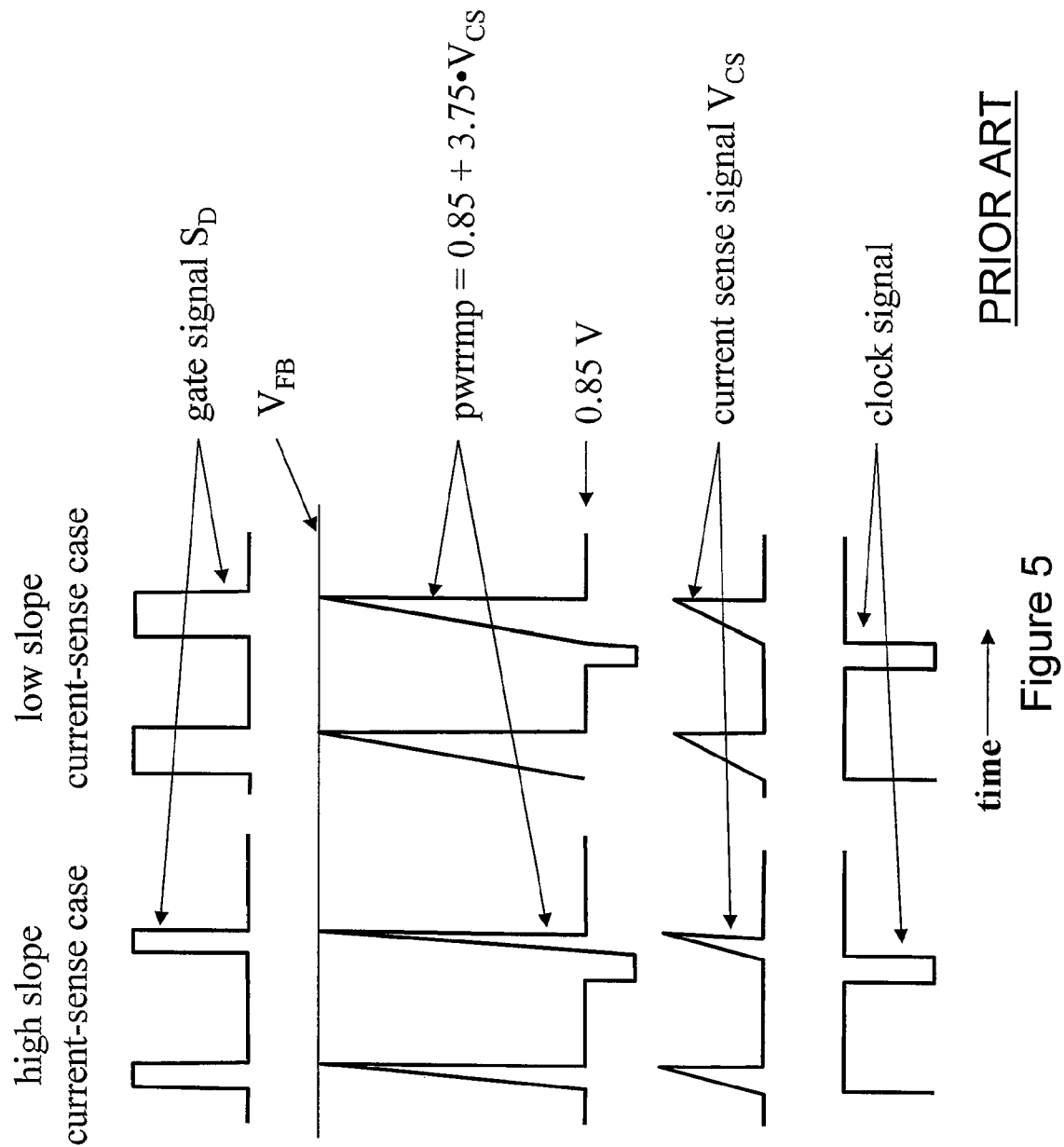
FIG. 5 illustrates representative waveforms showing ideal current-mode regulation effects produced by a controller.

Turning now to FIG. 5, illustrated are representative waveforms showing conventional but ideal CoolSET F3 current-mode regulation. Illustrated on the left side of FIG. 5 are waveforms illustrating a higher slope of the current-sense signal $V_{CS}$, and on the right side of FIG. 5 are waveforms illustrating a lower slope of the current-sense signal $V_{CS}$. At the bottom of the figure are waveforms illustrating an internal clock signal, a rising edge of which initiates a duty cycle of the power converter. Above the clock signal are waveforms illustrating the current-sense signal $V_{CS}$, illustrating a higher slope on the left side of the figure, and a lower slope on the right side of the figure. Above the current-sense waveforms, further waveforms are illustrated showing a modified current-sense signal "pwmrmp" that represents a ramp signal that is compared with the feedback voltage $V_{FB}$ to terminate the power converter duty cycle. The modified current-sense signal pwmrmp is produced by scaling and offsetting the current-sense signal $V_{CS}$ as illustrated in the figure and described by equation (2) below:

$$pwrrmp = 0.85 + 3.7 \cdot V_{CS} \qquad (2)$$

At the top of the figure are waveforms illustrating the resulting gate signal $S_D$ to control conductivity of the power switch $Q_{main}$.

The feedback signal $V_{FB}$ reflects the output voltage level to the controller PWM. Initially, the internal clock signal sets the gate signal $S_D$ high, which turns on power switch $Q_{main}$. Current through power switch $Q_{main}$ rises, starting from 0 V.

A comparator is used to compare the feedback signal $V_{FB}$ and the signal pwmrmp to control duty cycle. When the signal pwmrmp is higher than $V_{FB}$, the gate signal that controls the power switch $Q_{main}$ is set low, and power switch $Q_{main}$ is turned off. The current-sense signal $V_{CS}$ and the signal pwmrmp goes low immediately.

In an ideal circuit, when the signal pwmrmp is slightly higher than the feedback signal $V_{FB}$, the power switch $Q_{main}$ is switched off immediately as indicated in FIG. 5, and the current-sense signal $V_{CS}$ correspondingly returns to 0 V.

Figure 6:
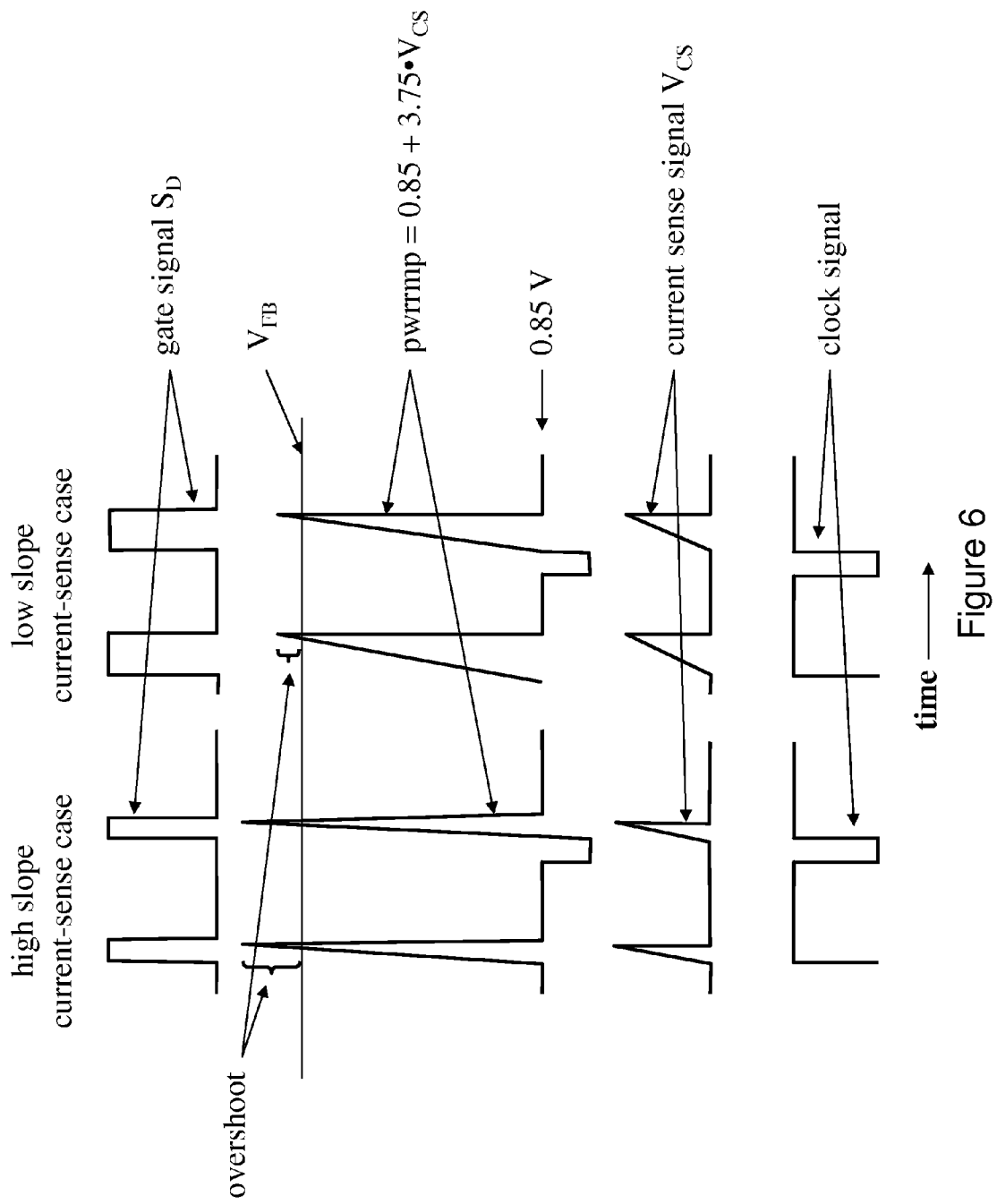
FIG. 6 illustrates representative waveforms showing overshoot of a current-sense signal in a power converter due to propagation delays in various circuit elements, resulting in delayed switch-off of a power switch.

Turning now to FIG. 6, illustrated are waveforms showing overshoot of a current-sense signal due to propagation delays in various circuit elements, variably delaying switch-off of the power switch $Q_{main}$. As illustrated in FIG. 6, there is generally some overshoot of the signal pwmrmp over the feedback signal $V_{FB}$ before the power converter duty cycle is terminated. After the current-sense signal pwmrmp becomes higher than the feedback signal $V_{FB}$, the power switch $Q_{main}$ is typically not switched off for about 200 ns, depending on particular circuit components. A delay of about 200 ns is a typical propagation delay for such signals in the circuit. As illustrated in FIG. 6, for a higher slope current-sense case, there is higher overshoot than for a lower slope current-sense case.

For a given level of the feedback signal $V_{FB}$, the higher slope current-sense case delivers more power to the output of the power converter. A higher slope current-sense case corresponds to a higher ac line input voltage. When the ac line input voltage is higher, the slope of the current is higher due to a higher potential difference appearing across the magnetizing inductance of transformer $T_1$, and for certain values of the feedback signal $V_{FB}$, this case delivers more power to the secondary side. Alternatively, when the ac line input voltage is lower, the slope of the current is lower, and for certain values of the feedback signal $V_{FB}$, this case delivers less power to the output of the power converter.

For the exemplary CoolSET F3 controller, the $V_{FB}$ threshold voltage for entering the burst mode is 1.32 V. If the ac line input voltage is 265 V, the current-sense signal $V_{CS}$ has higher slope, and the signal pwmrmp produces more overshoot. The system accordingly delivers more power to the power converter output. At light load, the output voltage $V_{out}$ goes higher, feedback signal $V_{FB}$ goes lower, and the controller enters burst mode operation. If the ac line input voltage is 85 V, the current-sense signal has a lower slope, and the signal pwmrmp produces less overshoot. Then the system delivers less power to the output. At light load, the output voltage goes low, the feedback signal $V_{FB}$ goes higher, and the controller does not reliably enter burst mode operation. The same situation occurs for reliably maintaining burst mode operation due to a sensed current limitation of 0.25 V.

Figure 7:
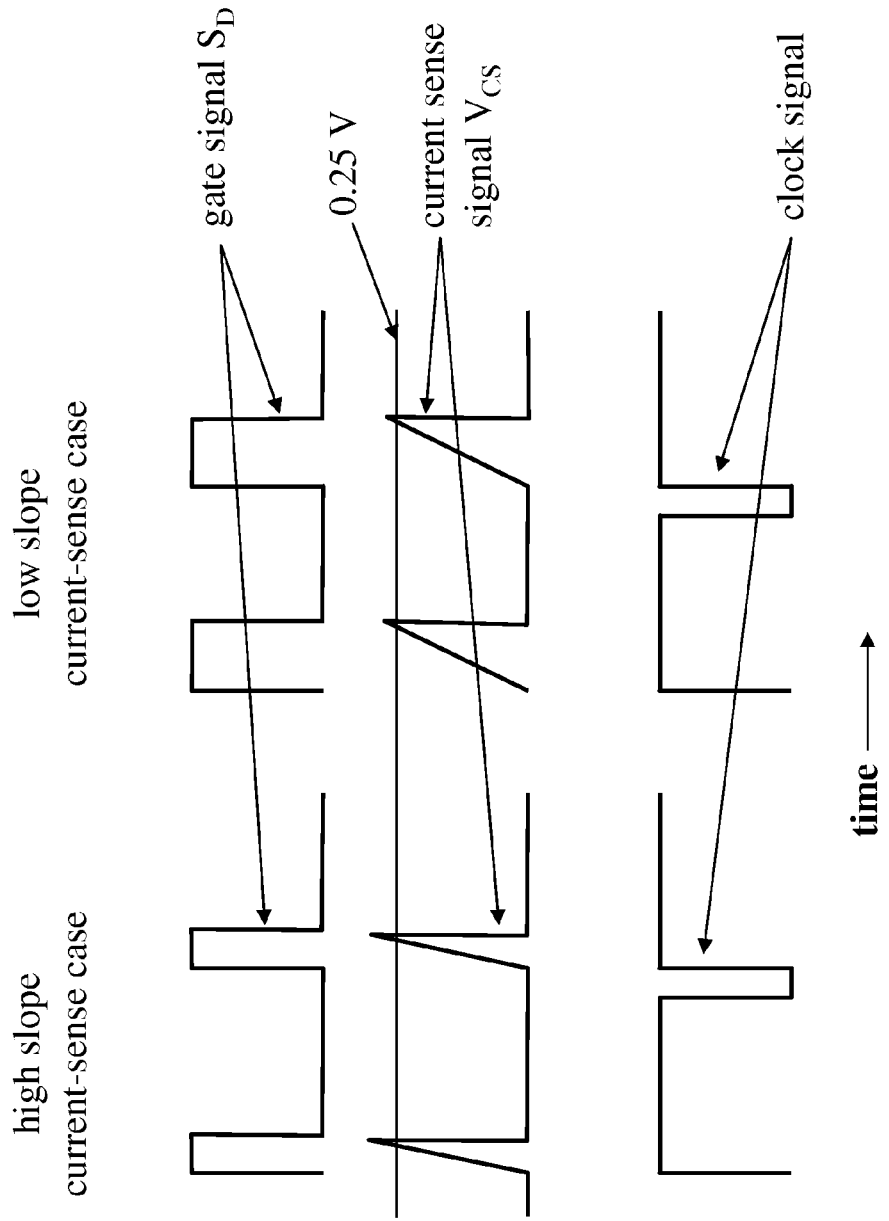
FIG. 7 illustrates representative waveforms for different current slopes in a power converter when entry into burst mode operation is dependent on a current limitation.

Turning now to FIG. 7, illustrated are waveforms for different current slopes when entry into burst mode operation is dependent on a current limitation. For the higher slope case, the current-sense signal $V_{CS}$ terminates at a higher peak value. For a lower slope case, the current-sense signal $V_{CS}$ terminates at a lower peak value. This results in different power levels for exiting burst mode operation for different values of slope of the current-sense signal $V_{CS}$.

Figure 8:
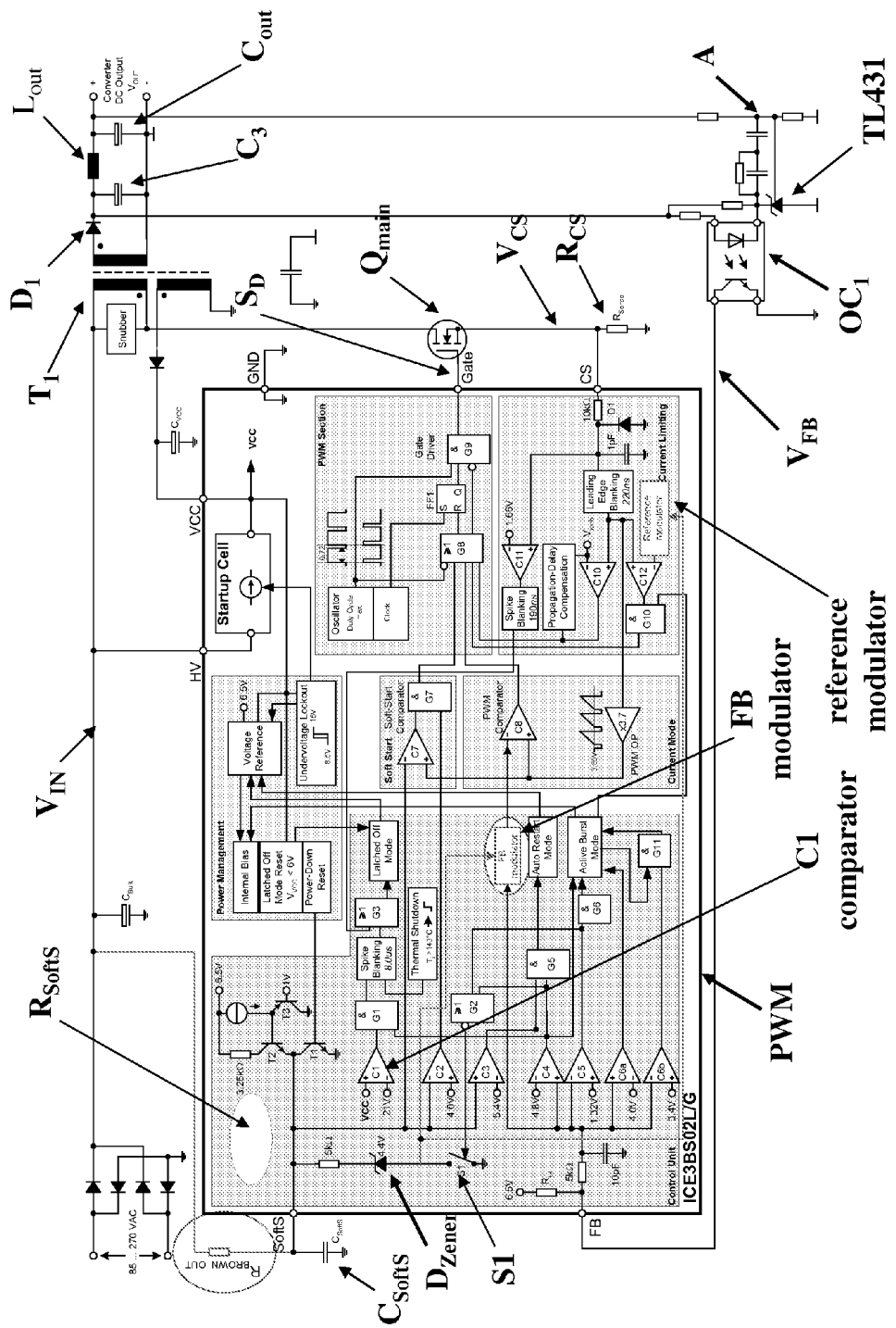
FIG. 8 illustrates a representative block diagram of a controller, constructed according to an embodiment.

Turning now to FIG. 8, illustrated is a representative block diagram of a modified CoolSET F3 controller, constructed according to an embodiment. As illustrated in FIG. 8, the internal soft-start resistor $R_{SoftS}$ illustrated in FIG. 4 is now omitted from the controller, and two additional blocks (FB (feedback) modulator and reference modulator blocks) are now added to the CoolSET F3 block diagram to resolve slope-related issues related to entering and leaving burst mode operation.

Figure 9:
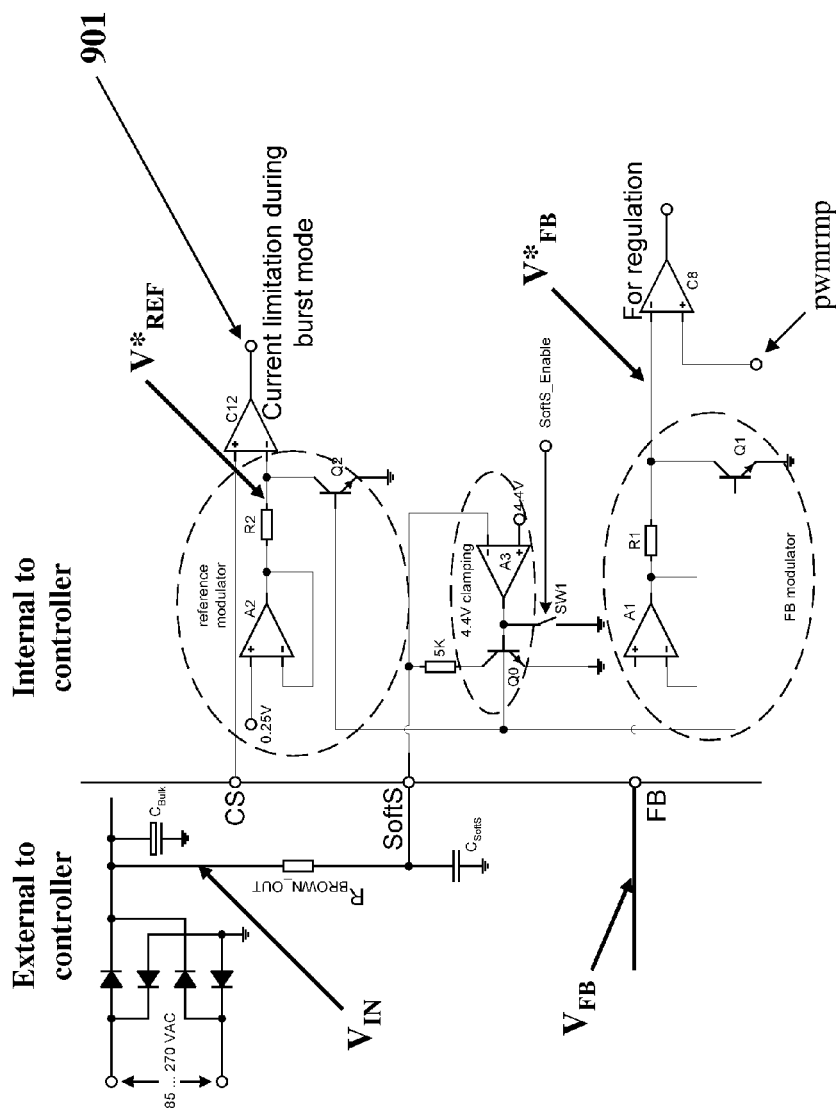
FIG. 9 illustrates schematic diagrams showing a feedback modulator block and a reference modulator block to modify threshold voltage levels that control entry into and exit from burst mode operation of a power converter, constructed according to an embodiment.

Turning now to FIG. 9, illustrated are schematic diagrams showing the FB modulator block and the reference modulator block to modify, respectively, threshold voltage levels, constructed in an embodiment. In the FB modulator block are an operational amplifier A1, a resistor R1, and a current-mirror transistor Q1. Using this circuit, a modified feedback signal $V^*_{FB}$ is created from the signal $V_{FB}$, incorporating an offset voltage dependent on the input voltage $V_{IN}$. The reference modulator block includes an operational amplifier A2, a resistor R2, and a current mirror transistor Q2. The previously fixed dc 0.25 V threshold is modified to produce a modified threshold voltage $V^*_{REF}$ that is offset from 0.25 V depending on the input voltage $V_{IN}$. Thus, as illustrated in FIG. 9, comparator $C_{12}$ is used to compare a reference voltage with a voltage offset dependent on an input voltage to the power converter with a current-sense signal during burst mode operation to assert a burst mode signal 901. Comparator $C_8$ is employed to compare the feedback signal $V^*_{FB}$, which is dependent on an output characteristic of the power converter, with the ramp signal pwmrmp during normal operation to control power converter duty cycle, and also when entering burst mode.

As illustrated in FIG. 4, a soft-start function is conventionally implemented with an external capacitor $C_{SoftS}$. The capacitor $C_{SoftS}$ is charged by an internal reference voltage through internal resistor $R_{SoftS}$. When $C_{SoftS}$ is charged from 0.0 V to 4.0 V, the soft-start function is complete and the voltage across the capacitor $C_{SoftS}$ is clamped to 4.4 V by a 4.4 V Zener diode $D_{Zener}$.

As illustrated in FIGS. 8 and 9, the soft-start function constructed according to an embodiment is implemented with an external capacitor $C_{SoftS}$ charged by the input voltage $V_{IN}$ through new external resistor $R_{BROWN\_OUT}$. The internal resistor $R_{SoftS}$ is omitted. As illustrated in FIG. 9, the internal 4.4 V clamping structure for the voltage across the capacitor $C_{SoftS}$ is now implemented by operational amplifier A3 and transistor Q0. When the voltage across the soft-start capacitor $C_{SoftS}$ is less than 4.0 V, the signal SoftS_Enable (produced by logic not illustrated in FIG. 9) is high, switch SW1 is turned on, clamping the output of amplifier A3 to ground, and the soft-start capacitor $C_{SoftS}$ is charged by the input voltage $V_{IN}$ through the resistor $R_{BROWN\_OUT}$. When voltage across the soft-start capacitor $C_{SoftS}$ is more than 4.0 V, the signal SoftS_Enable is low, switch SW1 is turned off, operational amplifier A3 is enabled, and voltage across the soft-start capacitor $C_{SoftS}$ is clamped to 4.4 V. When the voltage across the soft-start capacitor $C_{SoftS}$ is clamped, current through transistor Q0 is as indicated below by equation (3):

$$I_{current} = \frac{V_{IN} - 4.4\,V}{R_{BROWN\_OUT}} \tag{3}$$

where $V_{IN}$ is voltage across the bulk capacitor $C_{bulk}$. Its value is typically between 100 V and about 400 V, so the term 4.4V in equation (1) can be practically ignored. Equation (3) can be simplified to equation (4):

$$I_{current} = \frac{V_{IN}}{R_{BROWN\_OUT}} \tag{4}$$

From equation (4) above, if the external resistor $R_{BROWN\_OUT}$ is fixed, $I_{current}$ depends on $V_{IN}$. From $I_{current}$, the controller PWM can determine the value of the input voltage.

Equation (5) below describes the slope of the current in the inductor L $$C_{Slope} = \frac{V_{IN}}{L} \tag{5}$$

where L is the magnetizing inductance of transformer $T_1$ referenced to its primary winding. From equation (5), $C_{Slope}$ depends on the value of the input voltage $V_{IN}$. When the input voltage value $V_{IN}$ is high, $C_{Slope}$ is high, and vice versa.

From FIG. 6, it is shown that if current-sense signal slope rate is high, there is higher overshoot of current-sense signal $V_{CS}$. If the current-sense signal slope is low, there is lower overshoot of the current-sense signal. In order to have the same current-sense signal peak value, there should be a lower threshold voltage value for the higher slope case, and there should be a higher threshold voltage value for lower slope case.

As illustrated in FIG. 9, the modified $V_{FB}$ threshold voltage, $V^*_{FB}$, is given by equation (6):

$$V^*_{FB} = V_{FB} - n \cdot R_1 \cdot I_{current} = V_{FB} - n \cdot R_1 \cdot \frac{V_{IN}}{R_{BROWN\_OUT}} \tag{6}$$

where n is the current mirror ratio from transistor Q0 to transistor Q1. From equation (6), if the voltage $V_{IN}$ is high, then $V^*_{FB}$ is low. If $V_{IN}$ is low, $V^*_{FB}$ is high.

As illustrated in FIG. 9, the feedback voltage $V_{FB}$ is employed to form to a modified threshold voltage that is compared with the signal pwmrmp to produce better output voltage regulation. For a higher slope current-sense signal, the voltage $V^*_{FB}$ is lower; for a lower slope current-sense signal, the voltage $V^*_{FB}$ is higher.

Figure 10:
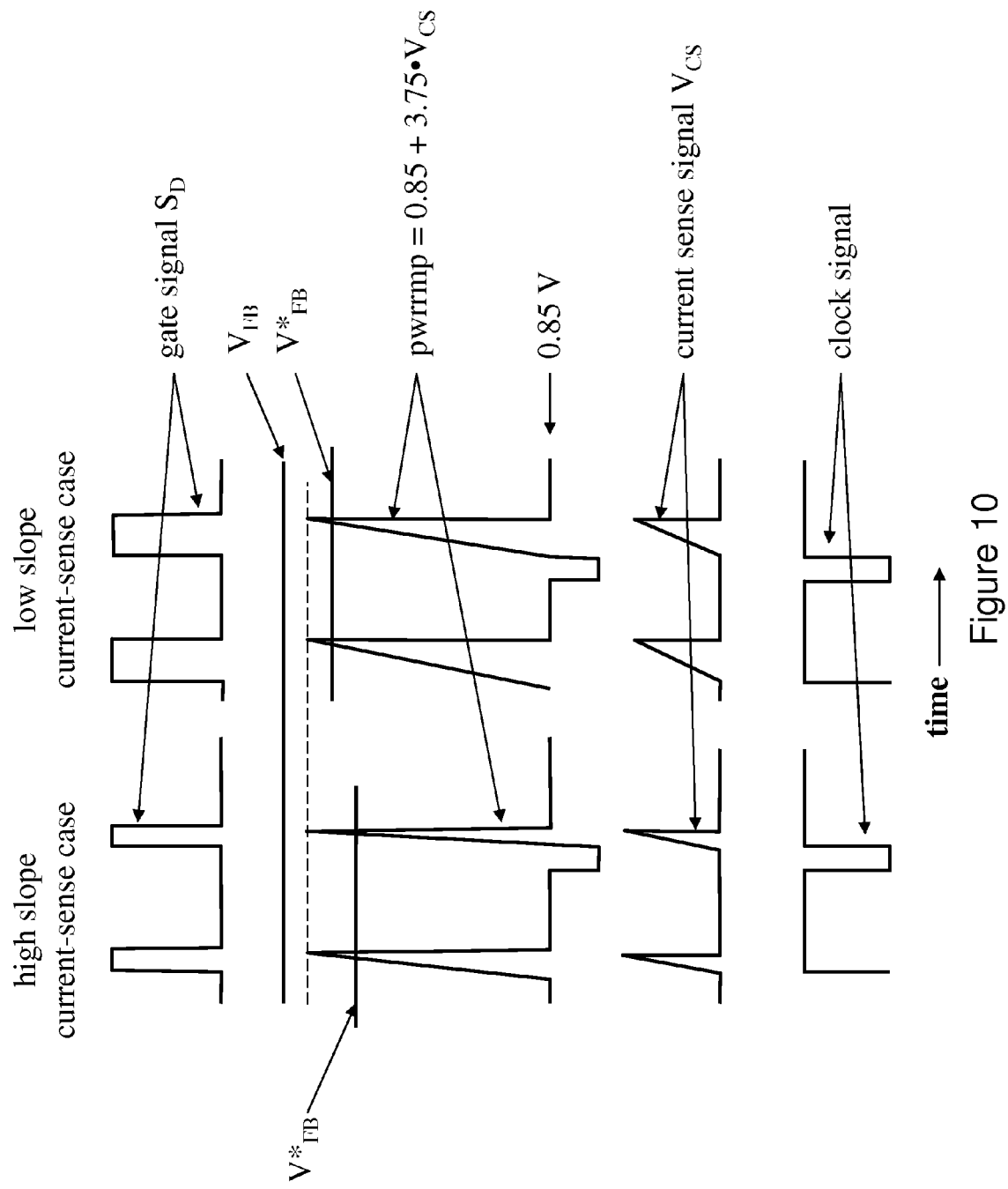
FIG. 10 illustrates representative waveforms showing signals in high slope and low slope current-sense cases, constructed according to an embodiment.

Turning now to FIG. 10, illustrated are waveforms in an embodiment showing signals in a higher slope current-sense case on the left side of the figure, and a lower slope current-sense case on the right side of the figure. At the bottom of the figure are waveforms illustrating the clock signal. Above the clock signal are waveforms illustrating the current-sense signal $V_{CS}$. Above the current-sense signals are waveforms illustrating the modified current-sense signal pwrrmp, and the modified threshold voltage $V^*_{FB}$, in an embodiment. The unmodified threshold voltage $V_{FB}$ lies above the modified threshold voltage $V^*_{FB}$. As illustrated in FIG. 10, including circuit propagation delay, using the modified threshold voltage $V^*_{FB}$ the current-sense signal causes the power converter duty cycle to terminate at the same peak value for both higher slope and lower slope current-sense cases, as indicated by the dashed line.

Figure 11:
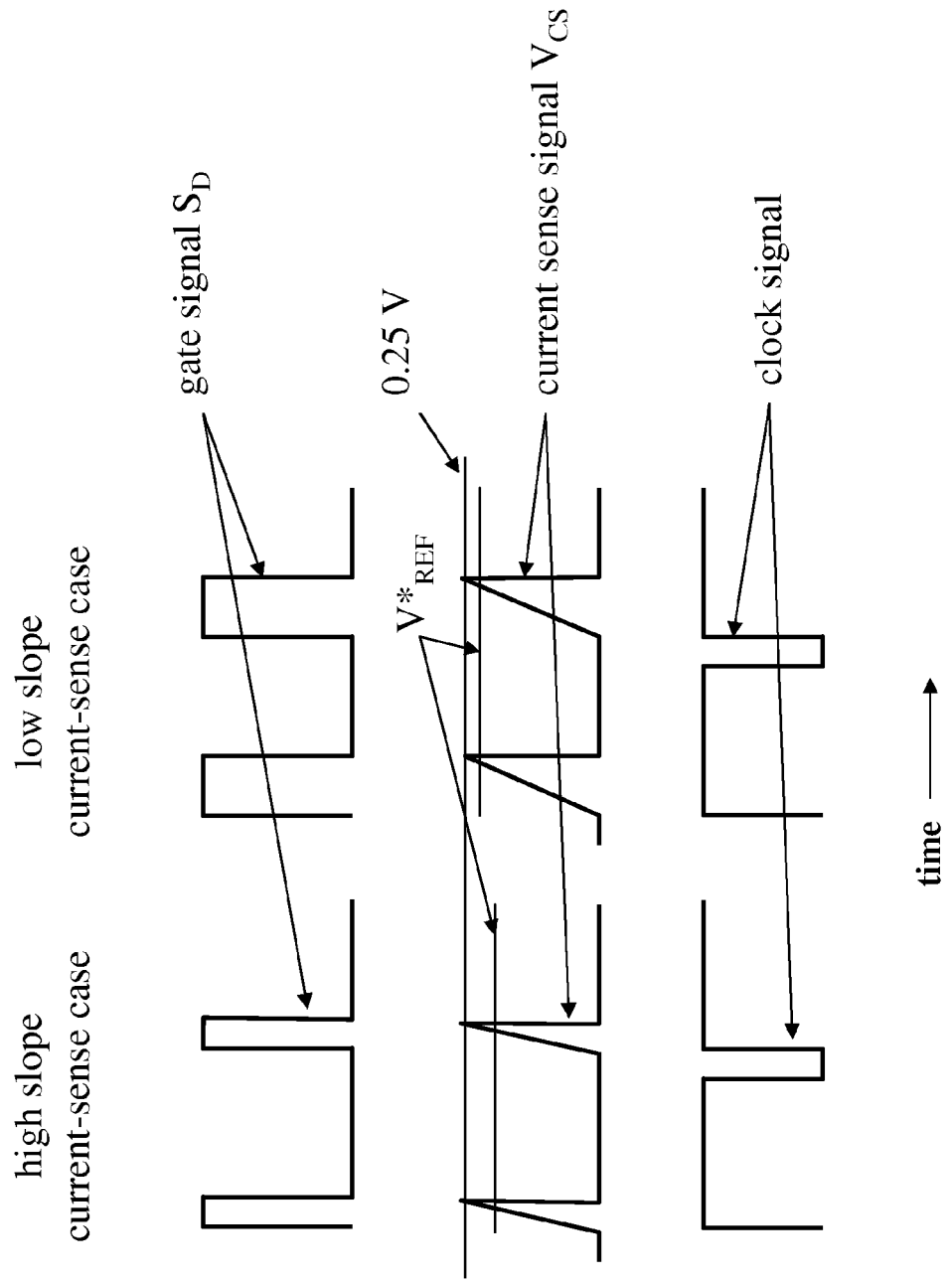
FIG. 11 illustrates representative waveforms showing signals in high slope and low slope current-sense cases, illustrating operation of a current limitation with an adjustable threshold for entry into and exit from burst mode operation, constructed according to an embodiment.

Turning now to FIG. 11, illustrated are waveforms showing signals in a higher slope current-sense case on the left side of the figure, and a lower slope current-sense case on the right side of the figure, illustrating operation of a current limitation with an adjustable current limitation threshold for entry to and exit from standby or burst mode operation, constructed according to an embodiment. At the bottom of the figure are waveforms illustrating the clock signal. Above the clock signal are waveforms illustrating the current-sense signal $V_{CS}$ and the modified threshold voltage $V^*_{REF}$. Waveforms showing the resulting gate signal $S_D$ are illustrated at the top of the figure. The threshold voltage used for current limitation in an embodiment is illustrated below in equation (7):

$$V_{th} = 0.25 - n \times R_2 \times \frac{V_{IN}}{V_{BROWN\_OUT}}. \quad (7)$$

If the voltage $V_{IN}$ is high, then the threshold voltage $V_{th}$ is low. If the voltage $V_{IN}$ is low, $V_{th}$ is high.

With continued reference to FIG. 11, a modified threshold voltage is employed for comparison with the current-sense signal for limiting current during burst mode operation. For a higher slope current-sense signal, the voltage $V_{th}$ is lower. For a lower slope current-sense signal, the voltage $V_{th}$ is higher. After circuit propagation delay, the current-sense signal is terminated at the same peak value for both cases.

Equation (8) below is used to calculate power for a current mode topology $$P = \frac{1}{2} \cdot L \cdot I_{peak}^2 \cdot f \quad (8)$$

where L is again the magnetizing inductance of transformer $T_1$ referenced to its primary winding, f is the power converter switching frequency, and $I_{peak}$ is the peak current through the power switch $Q_{main}$.

For entering burst mode operation, the threshold voltage $V_{FB}$ is less than 1.32 V, because there is no current-sense signal overshoot variation for high ac input voltage. From equation (8), the power converter delivers the same power to its output. At low ac input voltage, the power converter enters burst mode operation at the same output power condition as at a high ac input voltage.

For leaving burst mode operation, because there is no current-sense signal overshoot issue for high ac input voltage, from equation (8), the power converter delivers the same power to its output. At low ac input voltage, the power converter exits burst mode operation at the same output power condition as at a high ac input voltage.

A different threshold voltage depending on a power converter input voltage is thus used for high and low line input voltages for entering and exiting burst mode operation. For a high line input voltage, the threshold voltage is lower; for a lower line input voltage, the threshold is higher. A current-sense signal accordingly terminates power converter duty cycle at the same peak value for high and low line input voltages. Accordingly, the power converter operates at the same power level for entering and exiting burst mode operation.

Thus, as introduced herein, a controller provides improved control of entry into and exit from burst mode operation (or standby operation). A feedback signal $V_{FB}$ need not be too high for entering burst mode operation. The controller can enable uniform entry into burst mode operation for a wide range of input voltages, for example, for an input voltage $V_{IN}$ produced by an ac line input voltage that may vary from 85 Vac to 265 Vac. The controller can enable exit from burst mode operation at a substantially constant output power level for high and low line input voltages.

Figure 12:
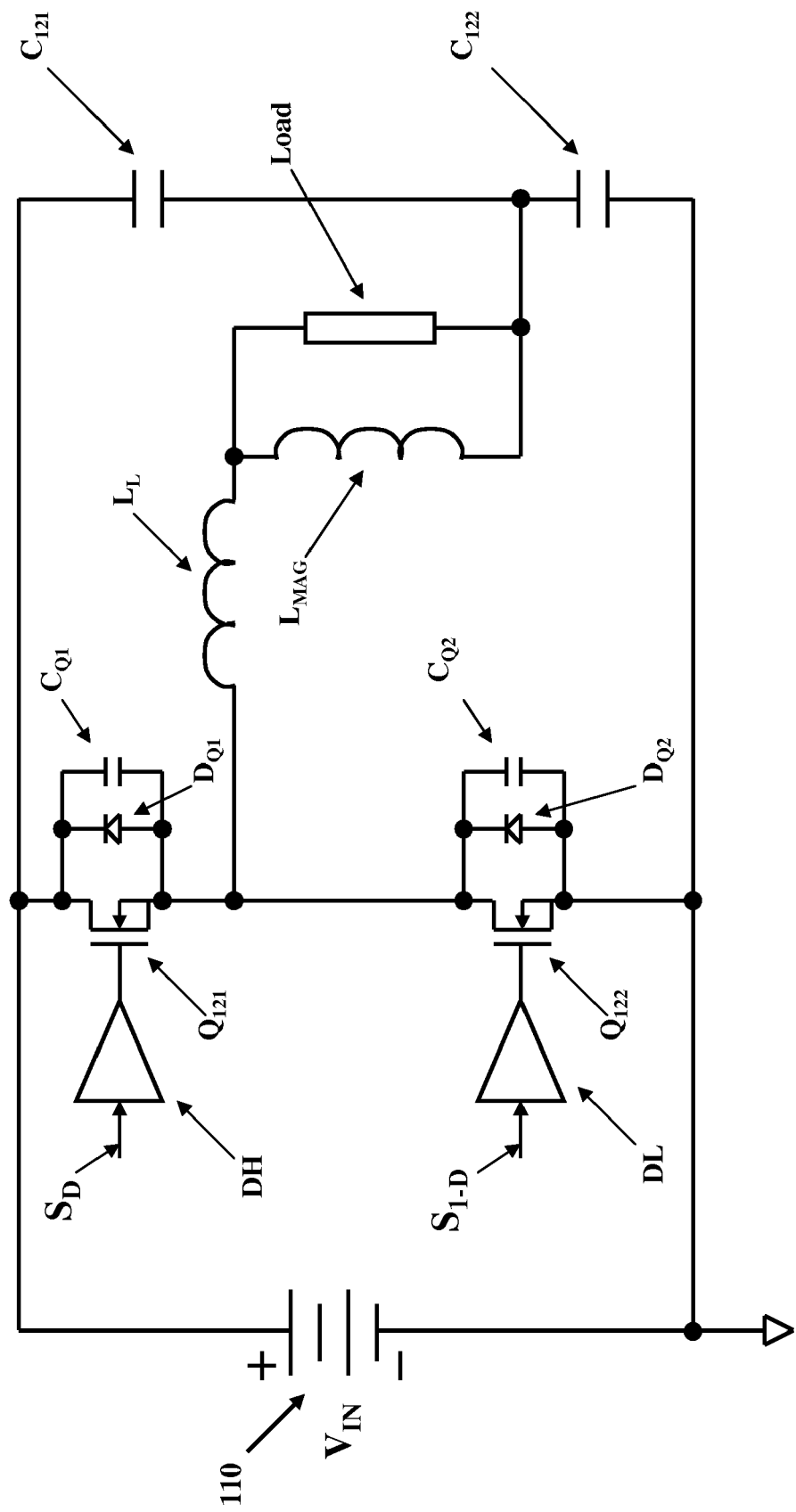
FIG. 12 illustrates a simplified schematic diagram of an inductor-inductor-capacitor resonant half-bridge power converter, representing a further switched-mode power converter topology that provides an exemplary power converter topology for an embodiment.

Turning now to FIG. 12, illustrated is a simplified schematic diagram of an LLC (inductor-inductor-capacitor) resonant half-bridge power converter, representing a further switched-mode power converter topology that provides an environment for the present invention. The half-bridge power converter includes power switches $Q_{121}$ and $Q_{122}$, resonant inductor $L_L$ (which may be formed as a leakage inductance of a power transformer), inductor $L_{MAG}$ (which may be formed as a magnetizing inductance of a power transformer), and resonant capacitors $C_{121}$ and $C_{122}$. The capacitors $C_{Q1}$ and $C_{Q2}$ are the parasitic capacitors of the power switches $Q_{121}$ and $Q_{122}$. The diodes $D_{Q1}$ and $D_{Q2}$ are the parasitic diodes of power switches $Q_{121}$ and $Q_{122}$. Power switch $Q_{121}$ is controlled by high-side driver DH, and power switch $Q_{122}$ is controlled by low-side driver DL. The load is represented by the block "Load." In a typical half-bridge power converter, a rectifier arrangement is typically included ahead of the load to provide a dc output.

Power switches $Q_{121}$ and $Q_{122}$ are alternatively turned on and off, without limitation, with roughly equal on and off times. This produces approximately a 50% duty cycle with a small amount of dead time advantageously included between turn-off of one power switch and turn-on of the other.

In this topology, output voltage regulation is generally obtained by modulating the switching frequency. A fixed dead time between the turn-off of one switch and the turn-on of the other may enable soft switching, which in turn enables high-frequency operation.

In an LLC topology, when a fault mode is detected, the switching action of the power switches is generally stopped, with a wait period that may be about 1 to 2 seconds before the power converter is restarted.

Two conventional power converter controllers include a restart timer for a delayed restart function. One product is the L6599 controller produced by STMicroelectronics. As described in the STMicroelectronics L6599 datasheet entitled "High-Voltage Resonant Controller," dated July 2006, which is hereby referenced and incorporated herein, the L6599 controller is a double-ended controller directed to a resonant half-bridge topology. As described in the L6599 datasheet, the L6599 controller provides delayed power converter shutdown when an overcurrent condition is detected.

Figure 13:
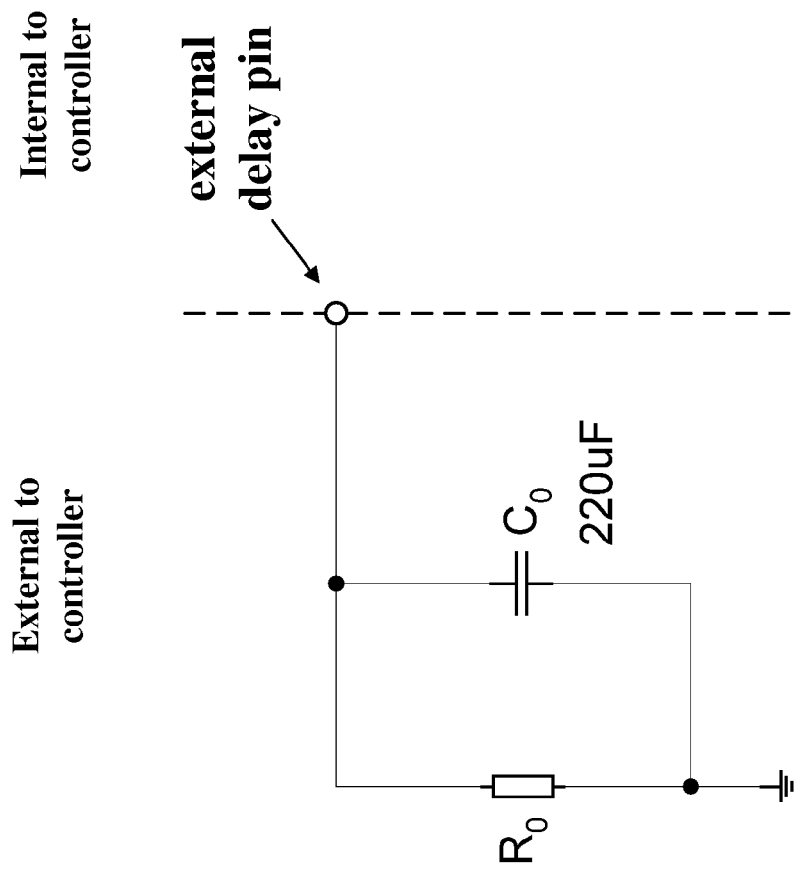
FIG. 13 illustrates a simplified circuit diagram of an external resistor and capacitor coupled to a delay pin as used in a conventional product for a restart timer function.

Turning now to FIG. 13, illustrated is a simplified circuit diagram of an external resistor $R_0$ and capacitor $C_0$ coupled to the delay pin as used in L6599 for the restart timer function. As illustrated in FIG. 13, the external capacitor and resistor are connected from the delay pin to ground to set both the maximum duration of an overcurrent condition before the controller stops the switching action of the power converter, and the delay after which the controller restarts the switching action. Each time the voltage on a current-sense input to the controller exceeds 0.8 V, the external capacitor is charged by an internal 150 μA current generator, and is slowly discharged by the external resistor. The current-sense input is coupled to a signal that senses primary current though a sense resistor or a capacitive divider for lossless sensing. If the voltage at the delay pin reaches 2 V, a soft-start capacitor is completely discharged so that the switching frequency is pushed to its maximum value and the 150 μA current generator is kept on.

Before the controller starts the restart timer after detection of a fault, the voltage on the external capacitor is already 3.5 V. When the voltage on the delay pin exceeds 3.5 V, the controller stops switching and the 150 μA current generator is turned off so that the voltage at the delay pin will decay through the external resistor. The controller is soft-restarted when the voltage at the delay pin drops below 0.3 V. The restart timer is thus determined by the external capacitor discharging from 3.5 V to 0.3 V. In this way, under short-circuit conditions, the converter operates intermittently. To implement a long restart delay, a substantial capacitor is required.

A second conventional power converter controller that includes a delayed converter restart after detection of a fault is the NCP1395 controller produced by OnSemiconductor, and described in OnSemiconductor datasheet entitled "High Performance Resonant Mode Controller, dated March 2006, which is hereby referenced and incorporated herein. The NCP1395 restart timer is also implemented with an external resistor and capacitor coupled in parallel to a controller pin. Before the controller starts the restart timer, the voltage on the external capacitor is already 4.0 V. When the controller starts the restart timer, no internal current is produced. The external capacitor is discharged by the external resistor. When the voltage on the external capacitor is discharged to 1.0 V, the controller restarts the switching action of the power converter. The restart timer time intervals are determined by the external capacitor discharging from 4.0 V to 1.0 V.

Thus, a restart timer function in the OnSemiconductor NCP1395 is implemented using one pin and two external components (a resistor and a capacitor). Because the restart timer operates over a relatively very long period of time, a large external capacitor and a resistor with high resistance are required, adding substantial cost to a power converter, particularly due to the need for a large capacitor.

As introduced herein, additional external components advantageously are not required to implement a delayed restart timer to restart a power converter after detection of a fault. Only existing components and pin are used for a restart function, thereby not adding cost to the power converter.

Figure 14:
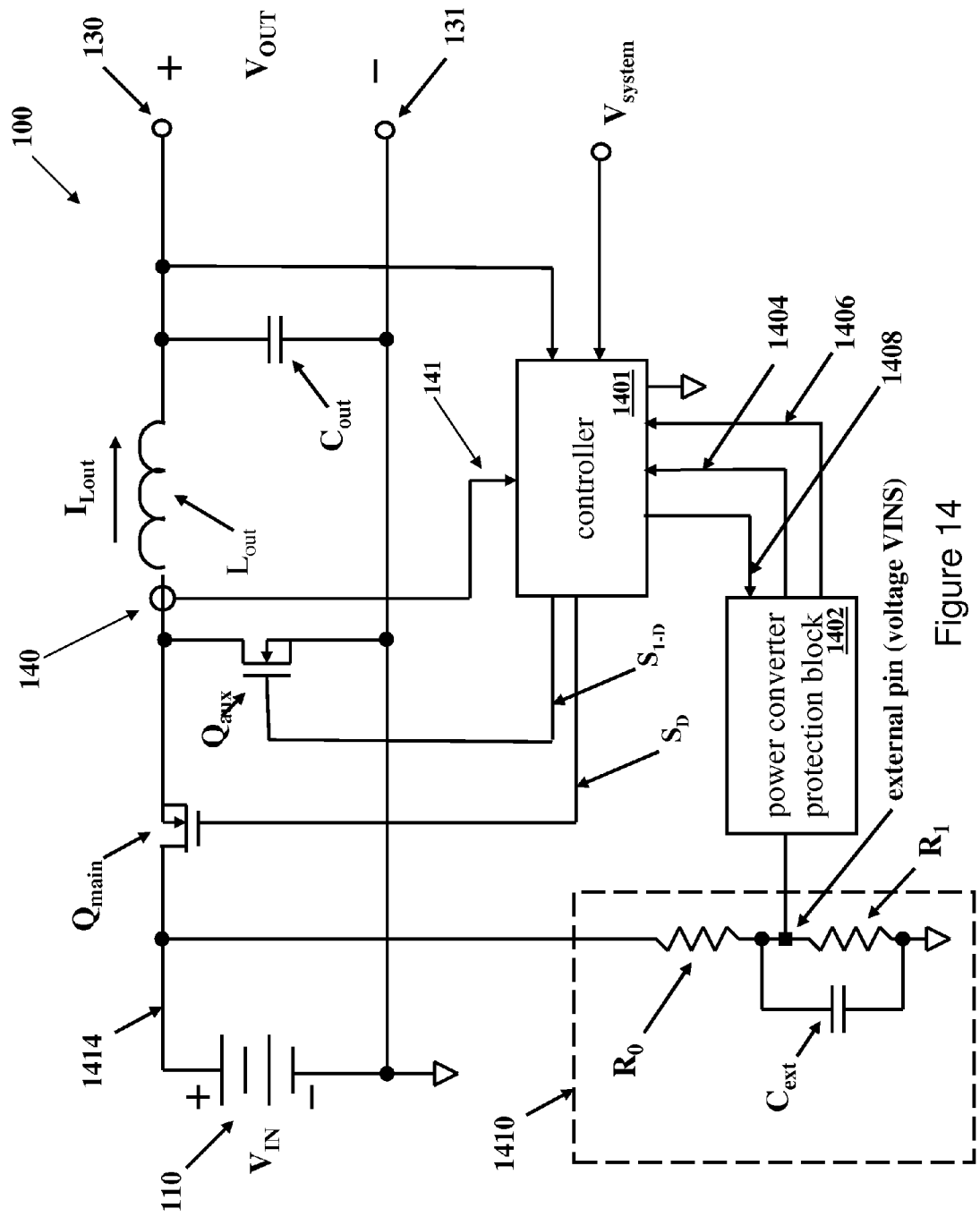
FIG. 14 illustrates a representative schematic drawing of a power converter including a resistor-divider network, a controller, and a power converter protection block, constructed according to an embodiment.

Turning now to FIG. 14, illustrated is a representative schematic drawing of a power converter including a resistor-divider network 1410, a controller 1401, and a power converter protection block 1402, constructed according to an embodiment. The power converter protection block 1402 may advantageously be formed as a part of controller 1401. An existing external pin (conventionally used only for input voltage sensing) and the external resistor-divider network 1410 including external resistors $R_0$ and $R_1$ and external capacitor $C_{ext}$ are reused, as introduced herein, for brownout and for delayed restart functions. The resistor-divider network is coupled to input voltage $V_{IN}$ of the power converter and produces an input voltage signal VINS at the external pin representing the voltage $V_{IN}$ of the line input 1414. The external components $R_0$, $R_1$, and $C_{ext}$ are ordinarily included in a power converter to sense an ac line input voltage. No additional external component or pin is advantageously required for the delayed restart timer function, thereby reducing power converter cost.

The power converter includes a controller 1401 coupled to the power switches $Q_{main}$ and $Q_{aux}$. The controller is configured to control a duty cycle of the power switches. The power converter further includes a power converter protection block 1402 coupled to the resistor-divider network 1410 and to the controller 1401 to produce a brownout signal 1404 to disable the switching action of the power switches if the input voltage is below a voltage threshold. The power converter protection block delays re-enabling switching action of the power switches after detection of a fault by the controller 1401. The controller 1401 signals clearance of a fault on the start restart timer signal line 1408. The power converter protection block further includes a logic network configured to alternately perturb the input voltage signal a set number of times in response to the start restart timer signal 1408 from the controller 1402 with a perturbing frequency dependent on capacitance of the capacitor $C_{ext}$ to produce the delayed restart signal 1406. The controller disables the duty cycle of the power switch in response to the brownout signal 1404 and the delayed restart signal 1406. Of course, further control signals not illustrated in FIG. 14 to perform additional functions as described herein can be exchanged between the controller 1401 and the power converter protection block 1402. The power converter protection block 1402 may be formed as a part of controller 1401.

Figure 15:
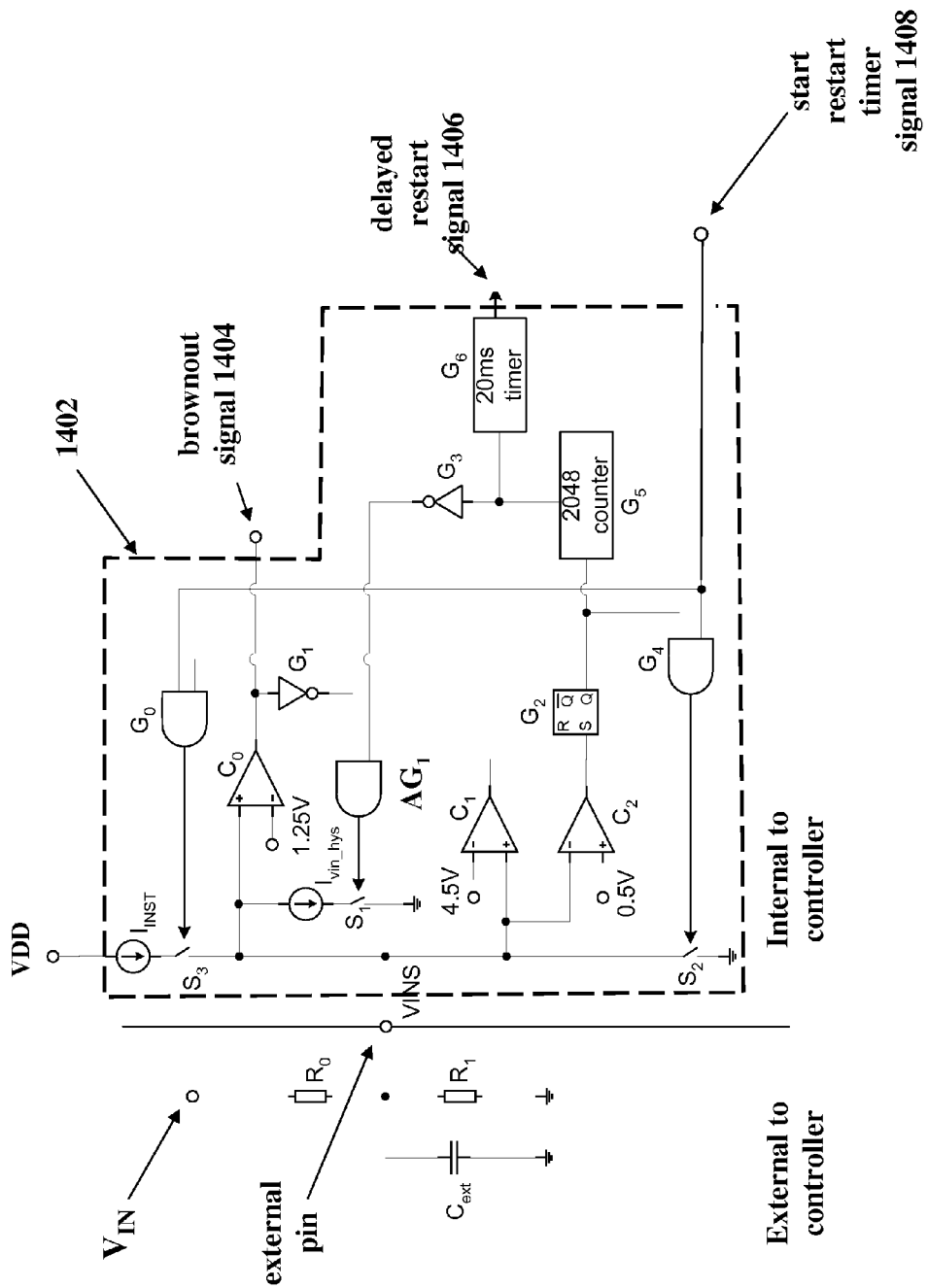
FIG. 15 illustrates a block diagram of the power converter protection block illustrated in FIG. 14, constructed according to an embodiment.

Turning now to FIG. 15, illustrated is a block diagram showing further structure of power converter protection block 1402 as described hereinabove with reference to FIG. 14.

The term "brownout" generally refers to the line input voltage dropping slowly from a voltage sufficient to support a power converter operational mode, for example for an ac input voltage in the range 100 Vac to 240 Vac, to a non-operational mode, for example for an ac input voltage less than 85 Vac. When the input voltage drops below the lower voltage limit of an operational mode, the power converter controller detects a brownout condition and may enter an overload protection mode and an auto-restart mode. However, an auto-restart mode can ordinarily generate pulsed switching producing an undesirable pulsed voltage waveform at the power converter output. A brownout feature may be included in a controller to stop switching of power switches when the input voltage is too low, thereby reducing production of a pulsed voltage waveform at the output of the power converter.

A brownout sensing function is employed to sense the input voltage level. With continued reference to FIG. 15, after attenuation by the resistor-divider network $R_0$, $R_1$, the attenuated input voltage VINS to the power converter at the external pin is compared in comparator $C_0$ with an internal 1.25 V reference voltage. When the attenuated input voltage is lower than a threshold voltage level, the brownout signal is asserted low, and the switching action of the power converter is turned off. When the input voltage is higher than a threshold voltage level, the brownout signal is asserted high, and the switching action of the power converter may be turned on.

As illustrated in FIG. 15, external resistors $R_0$, $R_1$, external capacitor $C_{ext}$, internal current source $I_{vin\_hys}$, comparator $C_0$, inverter $G_0$, AND gate $AG_1$, and switch $S_1$ are employed to implement the brownout sensing function.

When input voltage $V_{IN}$ is low, the brownout signal is low. The internal current source $I_{vin\_hys}$ is switched on by switch $S_1$ so that voltage VINS at the external pin is given by equation (9):

$$VINS = \frac{R_1}{R_0 + R_1} \cdot V_{IN} - R_0 \cdot I_{vin\_hys} \quad (9)$$

which is slightly lower than the voltage $$\frac{R_1}{R_0 + R_1} \cdot V_{IN} \quad (10)$$

that would ordinarily be produced by the resistor divider alone. This voltage is compared with a 1.25 V reference voltage. Accordingly, the input voltage $V_{IN}$ should be slightly higher in order for the voltage $$\frac{R_1}{R_0 + R_1} \cdot V_{IN} - R_0 \cdot I_{vin\_hys} \quad (11)$$

to be greater than 1.25 V. When this voltage is more than 1.25 V, the brownout signal is high, and the switching action of the power converter can be turned on. At this time the internal current source $I_{vin\_hys}$ is switched off, and the voltage VINS at the external pin is given by equation (12):

$$VINS = \frac{R_1}{R_0 + R_1} \cdot V_{IN}, \quad (12)$$

which is exactly the voltage produced by the resistor divider alone. This voltage is also compared with the internal 1.25 V voltage reference. When $$\frac{R_1}{R_0 + R_1} \cdot V_{IN} \quad (13)$$

is less than 1.25 V, the brownout signal is low, and the switching action of the power converter is turned off.

As described above, the brownout function includes an element of hysteresis. Its low threshold voltage is $$1.25\,V \cdot \frac{R_0 + R_1}{R_1}, \quad (14)$$

and its high threshold voltage is $$(1.25\,V + R_0 \cdot I_{vin\_hys}) \cdot \frac{R_0 + R_1}{R_1}. \quad (15)$$

As described above, the hysteresis voltage is externally adjustable with a value of $$(R_0 \cdot I_{vin\_hys}) \cdot \frac{R_0 + R_1}{R_1}. \quad (16)$$

To adjust hysteresis, the value of the resistor $R_0$ can be changed by an end user. The external capacitor $C_{ext}$ is included for stabilization of the circuit.

As illustrated in FIG. 15, external resistors $R_0$, and $R_1$, external capacitor $C_{ext}$, internal comparators $C_1$, and $C_2$, RS flip-flop $G_2$, AND gate $G_4$, 2048-timer counter $G_5$, 20 ms timer $G_6$, and switches $S_2$, and $S_3$ are included for the start restart timer function. When the start restart timer signal is asserted by a controller fault detection circuit (not illustrated) or by another circuit, switch $S_2$ is switched on first. This forces the voltage VINS at the external pin to be less than 0.5 V, and discharges the external capacitor $C_{ext}$ to a voltage less than 0.5 V. The internal switch $S_2$ is switched off, and current source $I_{INST}$ is switch on. This charges external capacitor $C_{ext}$ through the internal current source in the presence of the external resistor $R_1$. It takes some time for the voltage across the external capacitor $C_{ext}$ to reach 4.5 V. Because the external capacitor $C_{ext}$ can advantageously be quite small, for example 1 to 10 nF, the internal current source can quickly charge this capacitor from 0.5 V to 4.5 V, for example in 500 µs. The process above is repeated, for example 2048 times, to produce an extended delay period. The 20 ms timer block $G_6$ stabilizes the voltage VINS at the external pin, because during the 2048 swings of the voltage VINS across the external pin, the voltage-sensing function at the external pin is effectively compromised, as the input voltage $V_{IN}$ now cannot be readily related to the voltage produced by the resistor-divider network. In order for the voltage VINS of the external pin to be related to the input voltage $V_{IN}$, it is necessary to impose a delay without any voltage swing and without an internal current to allow the voltage VINS at the external pin to be stabilized by the capacitor $C_{ext}$. For example, a 20-millisecond delay imposed by a 20-millisecond timer is advantageously employed to provide a further delay as illustrated in FIG. 15. A delayed start restart timer signal with extended delay is thereby produced that can enable a controller to delay a power converter switching action after an event such as detection of a fault. Thus, a small external capacitor $C_{ext}$ is employed to serve multiple purposes.

Figure 16:
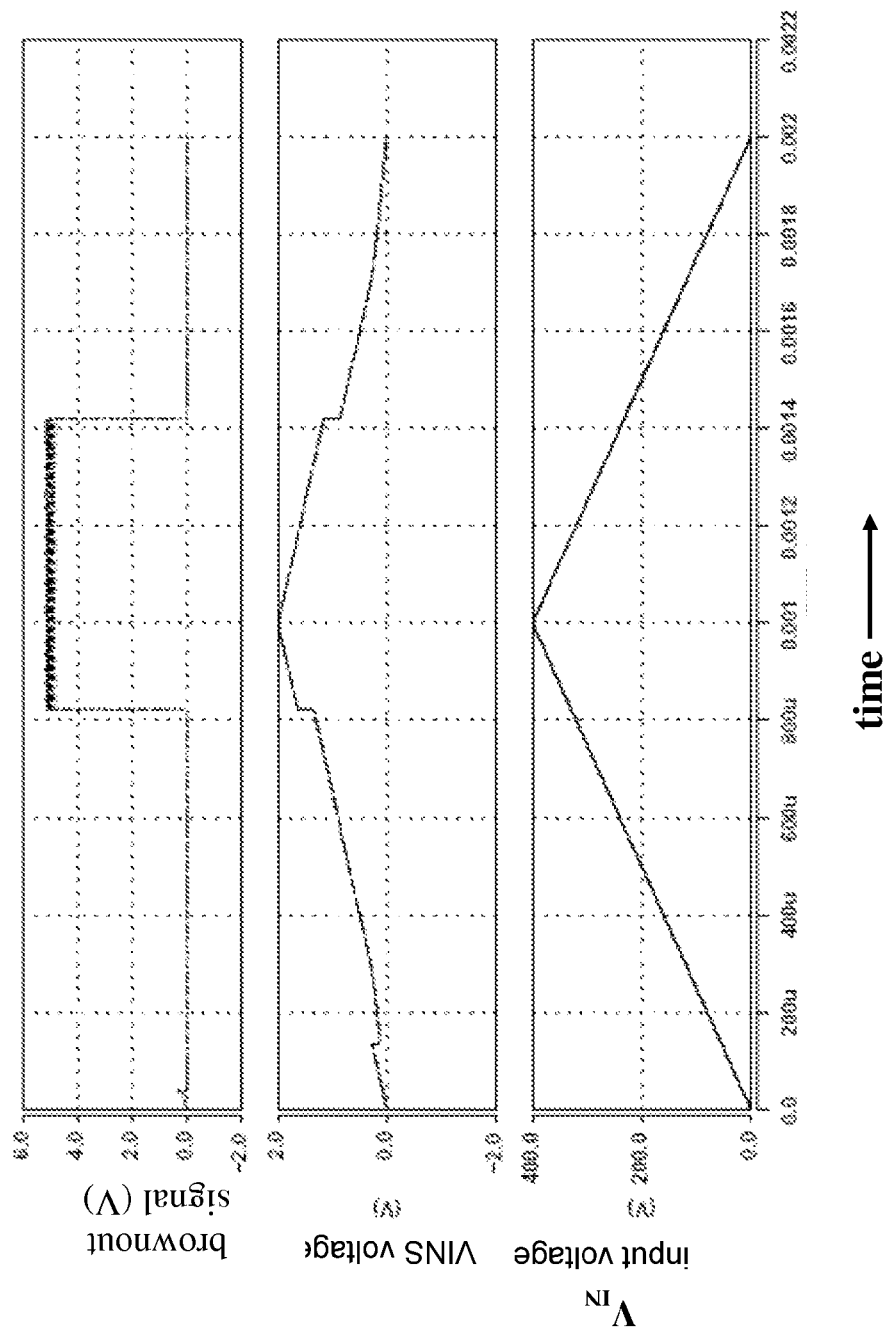
FIG. 16 illustrates waveforms produced during operation of a brownout/restart function in the absence of a power converter fault, constructed according to an embodiment.

Turning now to FIG. 16, illustrated are waveforms produced during operation of the brownout/restart function in the absence of a power converter fault, constructed according to an embodiment. In the lower portion of the figure, an exemplary input voltage $V_{IN}$ is illustrated ramping up to a maximum value of 400 V, and then ramping back down to 0 V. In the middle portion of the figure, illustrated is the voltage VINS produced across the external pin, illustrating the effect of hysteresis produced by the brownout signal. In the upper portion of the figure the brownout signal is illustrated.

Figure 17:
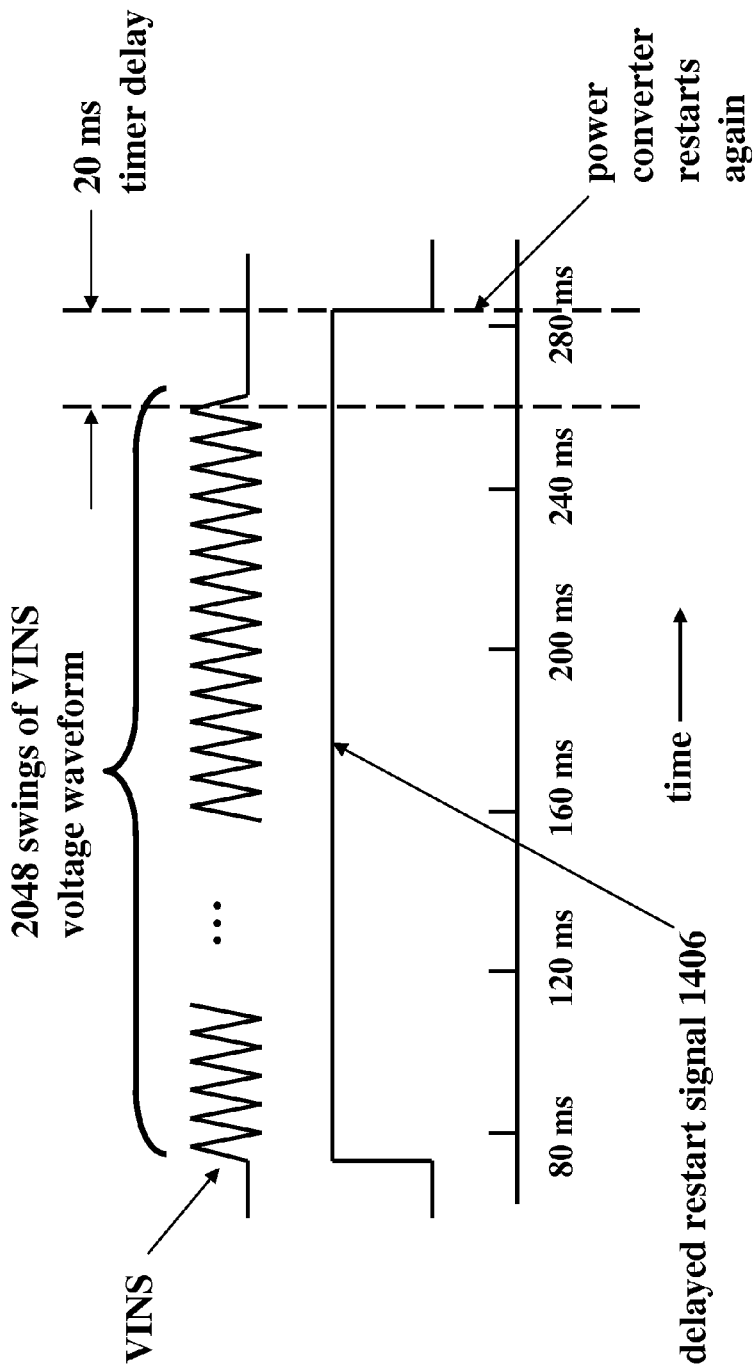
FIG. 17 illustrates a voltage waveform produced at a pin used for a restart timer function, constructed according to an embodiment.

Turning now to FIG. 17, illustrated is the VINS voltage waveform produced at the external pin, which is used for the restart timer function. As illustrated in FIG. 17, the restart timer swings the voltage VINS 2048 times. A further delay is imposed by the 20 ms timer illustrated in FIG. 15. The restart timer is externally adjustable by altering the value of the capacitor $C_{ext}$ illustrated in FIG. 15. The operation of the restart timer can also be changed, of course, by altering the reset count level of the 2048 counter.

Figure 18:
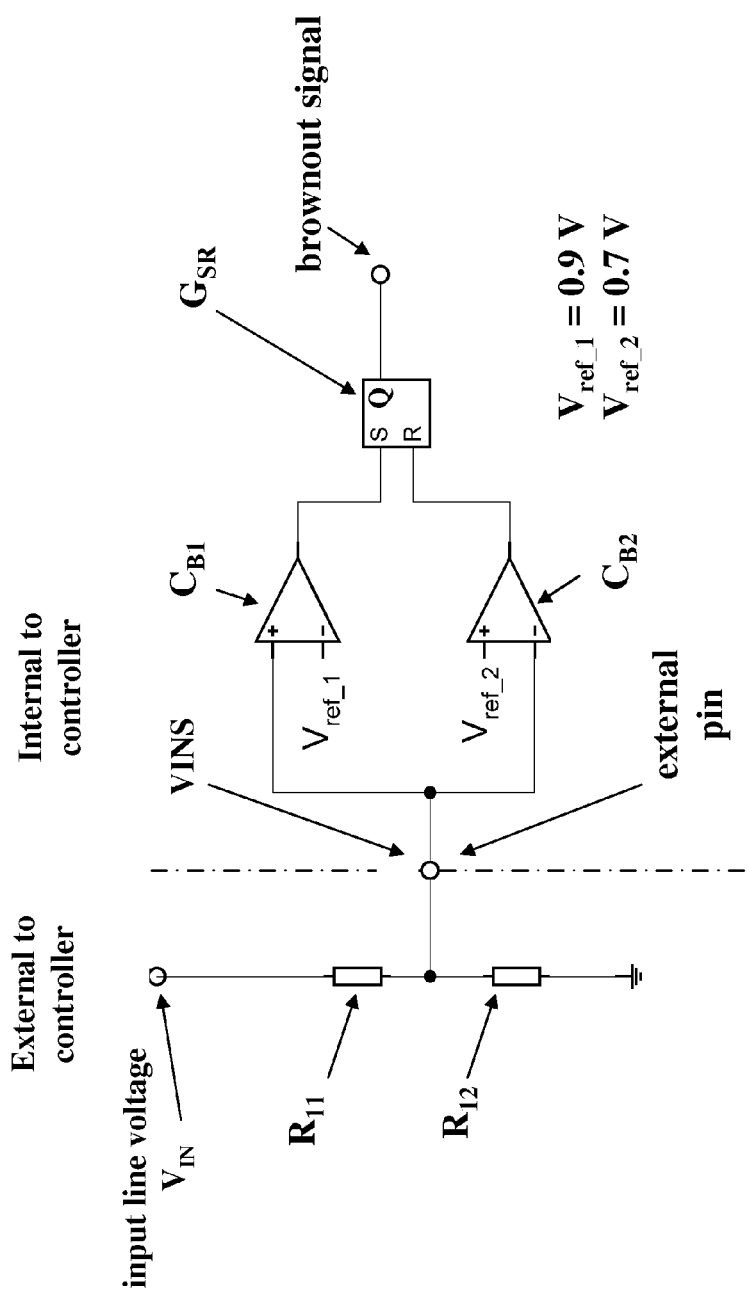
FIG. 18 illustrates a brownout signaling circuit coupled to the line input voltage to provide a protective brownout function, constructed according to an embodiment.
Figure 20:
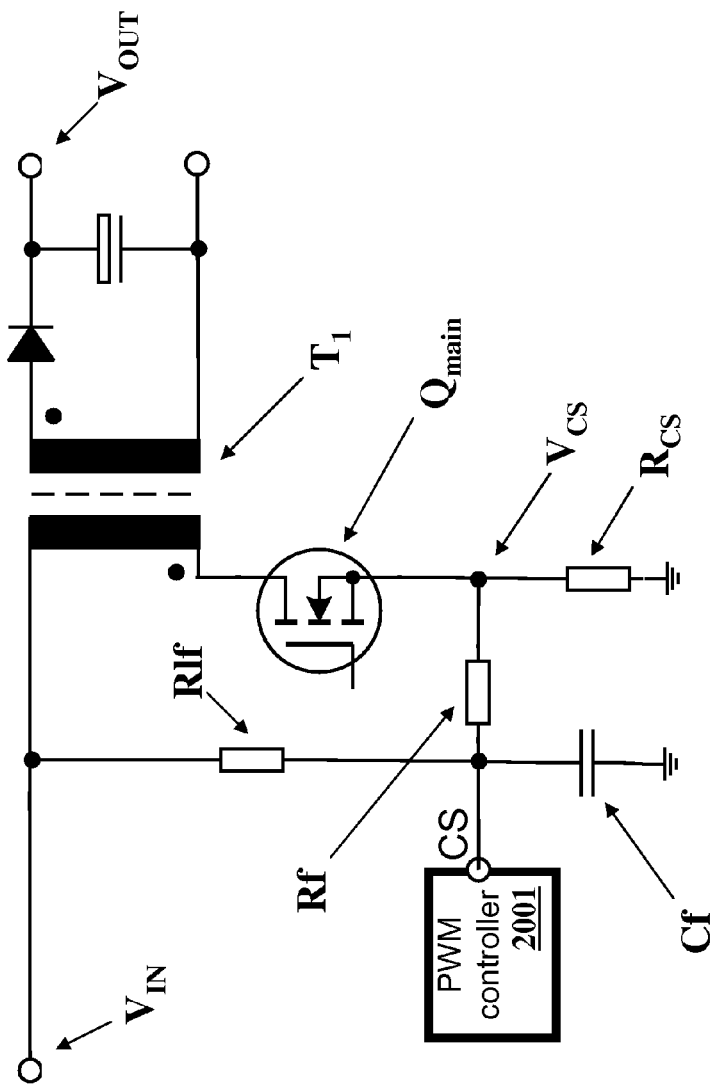
FIG. 20 illustrates a flyback power converter including a line input voltage feedforward circuit coupled to the input voltage and to a sensed current to adjust maximum power converter output power at high input voltage, constructed according to an embodiment.

Turning now to FIG. 18, illustrated is a further brownout signaling circuit coupled to the line input voltage $V_{IN}$ to provide a protective brownout function, constructed according to an embodiment. The brownout signaling circuit is implemented using two comparators and one flip-flop as illustrated in FIG. 18. The brownout signaling circuit includes a resistor-divider network including resistors $R_{11}$ and $R_{12}$ coupled to the line input voltage $V_{IN}$ that produces an input voltage-sensing signal VINS at the external pin. Comparators $C_{B1}$ and $C_{B2}$ in FIG. 20 are coupled to S-R flip-flop $G_{SR}$. When the line input voltage $V_{IN}$ is higher than a threshold level set by the voltage reference $V_{ref\_1}$, the brownout signal produced by the circuit is high, and the PWM controller such as the PWM controller 1401 illustrated in FIG. 14, operates to provide a switched control signal to a power switch such as the power switch $Q_{main}$. When the line input voltage $V_{IN}$ is lower than another threshold level set by the voltage reference $V_{ref\_2}$, the brownout signal is low, and the PWM controller 1401 terminates the switched control signal to the power switch. In an exemplary embodiment, the threshold voltage levels for $V_{ref\_1}$ and $V_{ref\_2}$ are 0.9 V and 0.7 V, respectively. Accordingly, the power converter exits a brownout mode of operation when the input voltage $V_{IN}$ becomes greater than 90 V, and enters a brownout mode of operation when the input $V_{IN}$ voltage is less than 70 V for an input resistor-divider ratio of 100:1.

Further techniques as introduced herein can be employed to make additional reductions in the number of pins required to control a power-processing unit such as a power converter. A number of conventional approaches have been used that rely on certain unique characteristics of a power converter to reduce the number of control pins employed therein. For example, as described by Balakrishnan, et al., in U.S. Pat. No. 6,304,462, entitled "Method and Apparatus Providing a Multi-Function Terminal for a Power Supply Controller," a multi-function pin can be employed to provide on/off control for a power converter, external adjustment of a current limit, under-voltage detection, over-voltage detection, and a maximum range for duty cycle adjustment. As described by Choi, et al., in U.S. Pat. No. 7,339,359, entitled "Terminal for Multiple Functions in a Power Supply," a sensed voltage of a pin can be selectively employed to activate one of two functional circuits in a power converter. As described by Petricek, et al., in U.S. Pat. No. 6,437,547, entitled "Board Mountable Power Supply Module with Multi-Function Controlled Pin," a control pin can be employed to disable a power converter module and to trim its output voltage. As described by Lin, et al., in U.S. Pat. No. 7,233,131, entitled "Circuit and Method for Implementing a Multi-Function Pin on a PWM Controller Chip in a Voltage Converter," a multi-functional pin is coupled to one lead of a resistor, and another lead of the resistor is coupled to a phase node between two power switches of a power converter. The multi-functional pin performs the functions of an enable function, a power sensing function, and an overcurrent protection function. Each of these patents is hereby referenced and incorporated herein.

For a flyback converter operated in continuous current mode (CCM), slope compensation of a current-sense signal in a feedback control loop is generally included as described previously to preserve stability of the control loop if the duty cycle is larger than 50%. However, the addition of a slope compensation signal to a sensed current reduces the output power due to a reduction in duty cycle (for a fixed level of a feedback signal) as well as average current.

Figure 19:
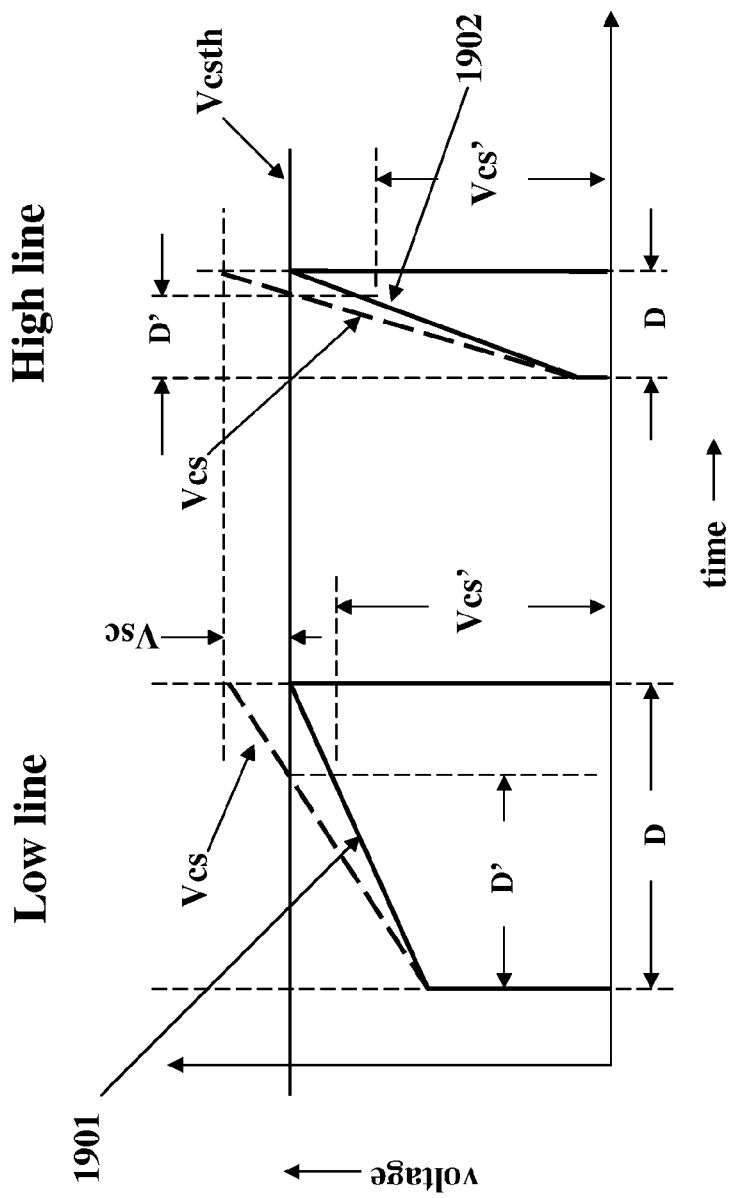
FIG. 19 illustrates current-sense waveforms for a switched-mode power converter operating in a continuous conduction mode for low line and high line input voltages, constructed according to an embodiment.

Turning now to FIG. 19, illustrated are current-sense waveforms for a switched-mode power converter operating in CCM for low line input voltage on the left side of the figure, and high line input voltage on the right side of the figure. The waveforms 1901 and 1902 represent a sensed current before an added slope compensation voltage, and the waveforms Vcs represent the sensed current after an added slope compensation voltage. The symbol D represents the duty cycle that would result from a current-sense threshold voltage Vcsth before application of an added slope compensation voltage. Without adjustment of the threshold voltage Vcsth, a shortened duty cycle D' would be produced by the addition of a slope compensation voltage. Raising the threshold voltage by the increment Vsc restores duty cycle with an added slope compensation voltage to its former value D.

The addition of a slope compensation voltage without a compensating change in the threshold voltage results in a corresponding reduction of average current from Iavg to Iavg'. This can be computed as follows. Before adding slope compensation, input power is given by equation (17)

$$Pin = V_{IN} \cdot Iavg \cdot D \quad (17)$$

where $$Iavg = Ip - 0.5 \cdot \Delta I \quad (18)$$

and $$\Delta I = V_{IN} \cdot D / (Lp \cdot fs). \quad (19)$$

In the equations above and in those following, Pin is input power to the power converter, $V_{IN}$ is the power converter line input voltage, D is duty cycle, fs is power converter switching frequency, Lp is inductance of the transformer referenced to its primary winding, Ip is transformer primary peak current, $\Delta I$ is the change in inductor current, and Iavg is power converter average output current. After adding slope compensation, the input power becomes $$Pin' = V_{IN} \cdot Iavg' \cdot D' \quad (20)$$

where $$Iavg' = (Ip - \Delta I) + 0.5 \cdot \Delta I' - Isc \quad (21)$$

and $$\Delta I' = V_{IN} \cdot D' / (Lp \cdot fs). \quad (22)$$

In the equations above, $\Delta I'$ is the reduced change in inductor current, Iavg' is the reduced total input power, and Isc is the slope compensation current.

In order to retain maximum output power for a power converter, the resistance of the current-sense resistor $R_{CS}$ is reduced so that the peak current and duty cycle are increased. However, if the resistance of the current-sense resistor is reduced, the maximum power converter output power is not the same for low and high line input voltages. High line input voltage results in a higher maximum power converter output power than low line input voltage.

Turning now to FIG. 20, illustrated is an embodiment of a flyback power converter including a line input voltage feedforward circuit coupled to the input voltage $V_{IN}$ and to the sensed current $V_{CS}$ to adjust maximum power at high input voltage. The input voltage feedforward circuit coupled to power converter PWM controller 2001 includes the resistors Rlf and Rf and the capacitor Cf. The input voltage feedforward circuit produces a voltage bias that is added to the sensed current by coupling one lead of the resistor Rlf to the input voltage, $V_{IN}$, and the other lead to the current-sense pin, CS, of the PWM controller 2001. The incremental voltage coupled to the pin CS is $$Vlf = V_{IN} \cdot Rf/Rlf. \quad (23)$$

Figure 21:
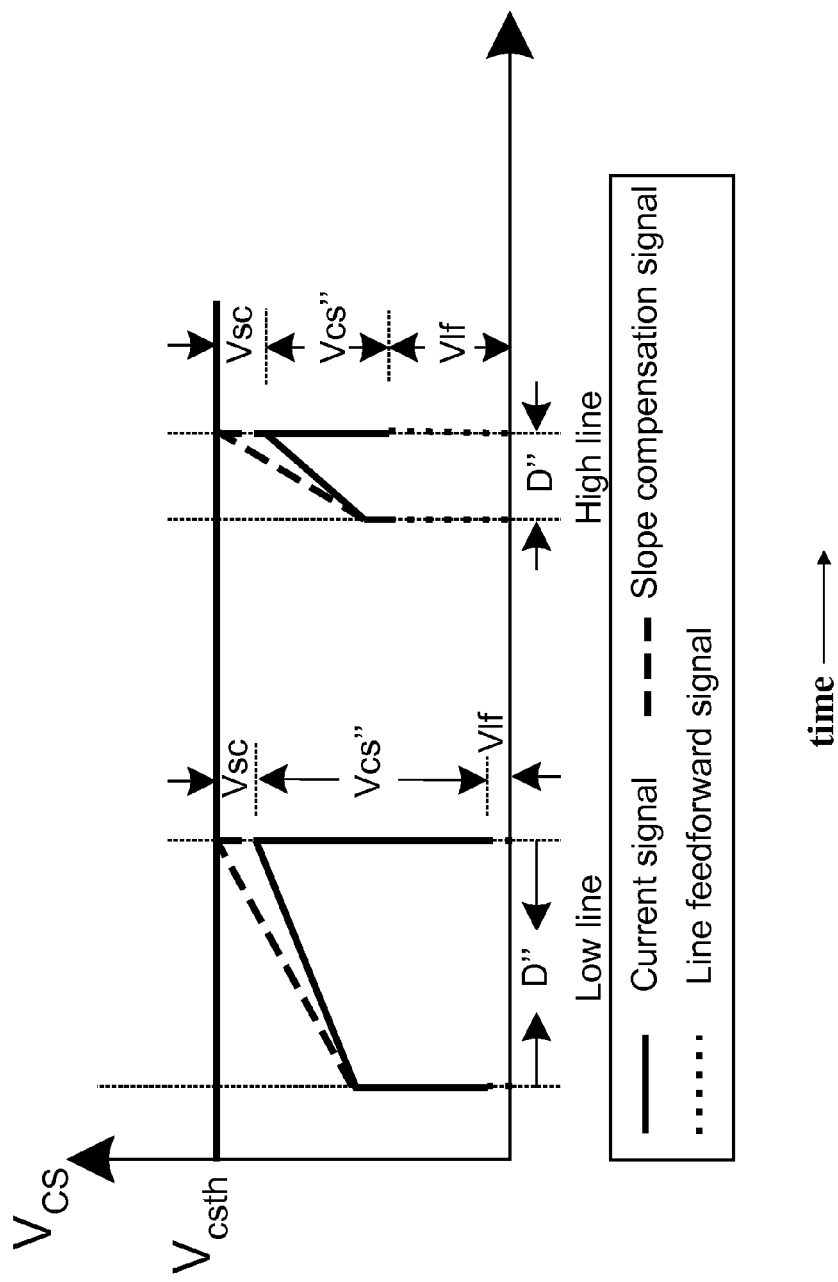
FIG. 21 illustrates continuous conduction mode current waveforms with slope compensation including line input voltage feedforward, constructed according to an embodiment.

Turning now to FIG. 21, illustrated are CCM current waveforms with slope compensation including line input voltage feedforward. As illustrated in FIG. 21, the final current-sense voltage Vcsth is the sum of Vlf, Vcs and Vsc:

$$Vcsth = Vlf + Vcs'' + Vsc. \quad (24)$$

In a preferred embodiment, the resistance of the current-sense resistor $R_{CS}$ illustrated in FIG. 20 is reduced to obtain a uniform maximum power converter output power at low line input voltage. The input voltage feedforward circuit is advantageously included to add an input voltage feedforward signal to reduce maximum power converter output power at a high input voltage.

Figure 22:
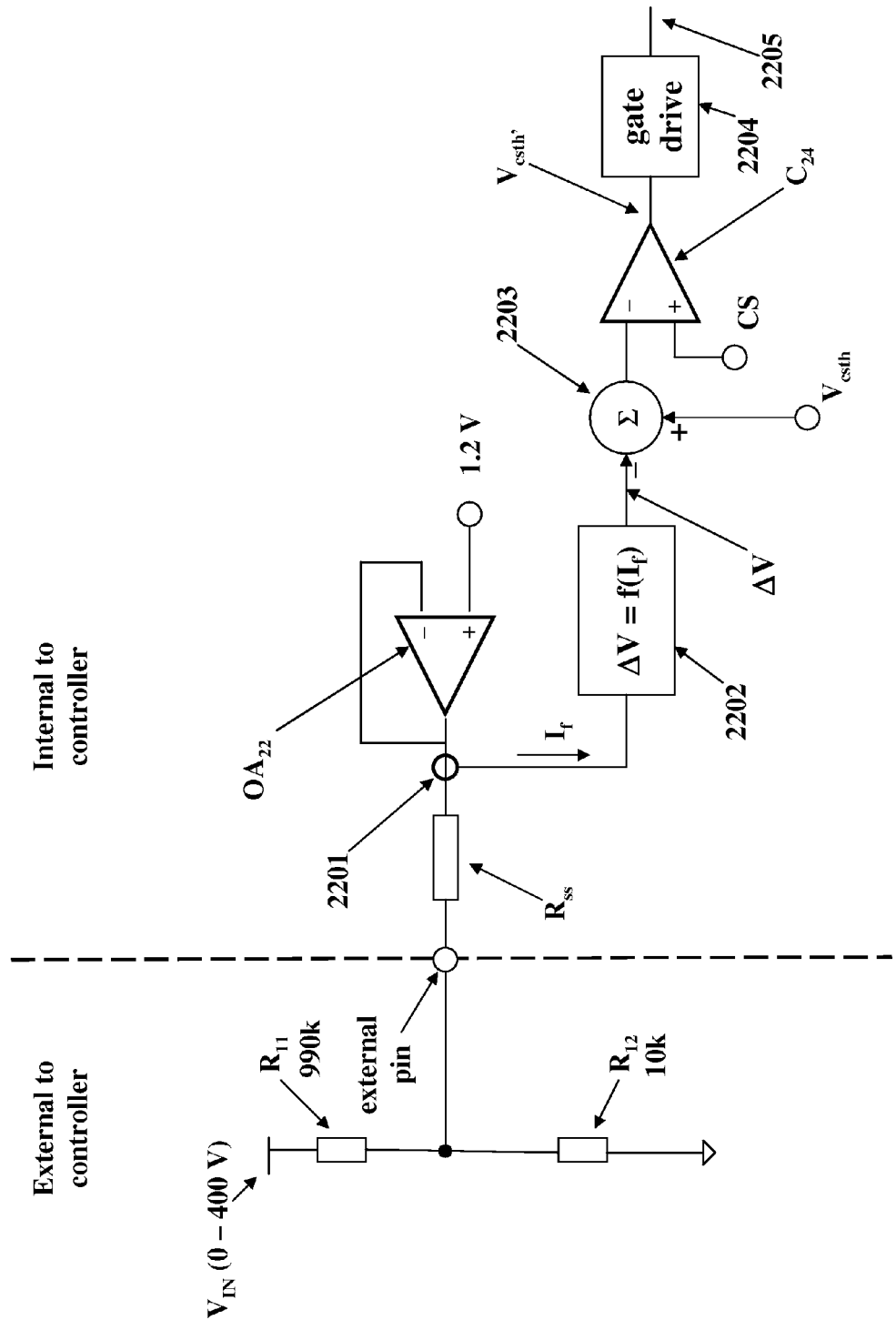
FIG. 22 illustrates an exemplary line feedforward circuit coupled to the input voltage and to an external pin to provide maximum output power control for a power converter, constructed according to an embodiment.

Turning now to FIG. 22, illustrated is a further exemplary line feedforward circuit coupled to the voltage $V_{IN}$ and to the external pin to provide maximum power control for the power converter. External to the power converter controller is a resistor-divider network including resistor $R_{11}$ and resistor $R_{12}$. The common node between these two resistors is coupled to the external pin. Internal to the power converter controller, the external pin is coupled to resistor $R_{ss}$, the other terminal of which is coupled to the output of operational amplifier $OA_{24}$. Operational amplifier $OA_{24}$ produces a relatively stiff voltage at its output equal to the 1.2 V reference voltage coupled to its noninverting input. The resulting current $I_f$ that flows through resistor $R_{ss}$ is transformed by transconductance amplifier 2202 to the voltage $\Delta V$ that is coupled to the negative input of summer 2203. The current $I_f$ can be estimated from the equation:

$$I_f = (V_{external\_pin} - 1.2)/R_{ss}. \quad (25)$$

The transconductance amplifier 2202 produces an output voltage $\Delta V = m \cdot I_f$ where m is a multiplier, e.g., 12,000. The positive input of summer 2203 is coupled to the current-sense threshold voltage $V_{csth}$, which is the maximum value of sensed current as described previously hereinabove. The output of summer 2203 is coupled to the inverting input of comparator $C_{24}$. The noninverting input of comparator $C_{24}$ is coupled to the current-sense signal CS. Accordingly, the maximum current-sense limit is reduced as the line input voltage is increased. The current that flows into the controller can be changed by changing the value of the resistor $R_{ss}$. Since the voltage $V_{IN}$ is typically in the range 120 to 400V, the corresponding voltage at the external pin is generally less than 4 V. The output of comparator $C_{24}$ is coupled to gate drive circuit 2404 that produces a signal 2205 to drive a power converter power switch, such as the signal $S_D$ illustrated in FIGS. 1 and 2. When the signal 2205 is high, the power switch is turned on; when the signal 2205 is low, the power switch is turned off.

Figure 23:
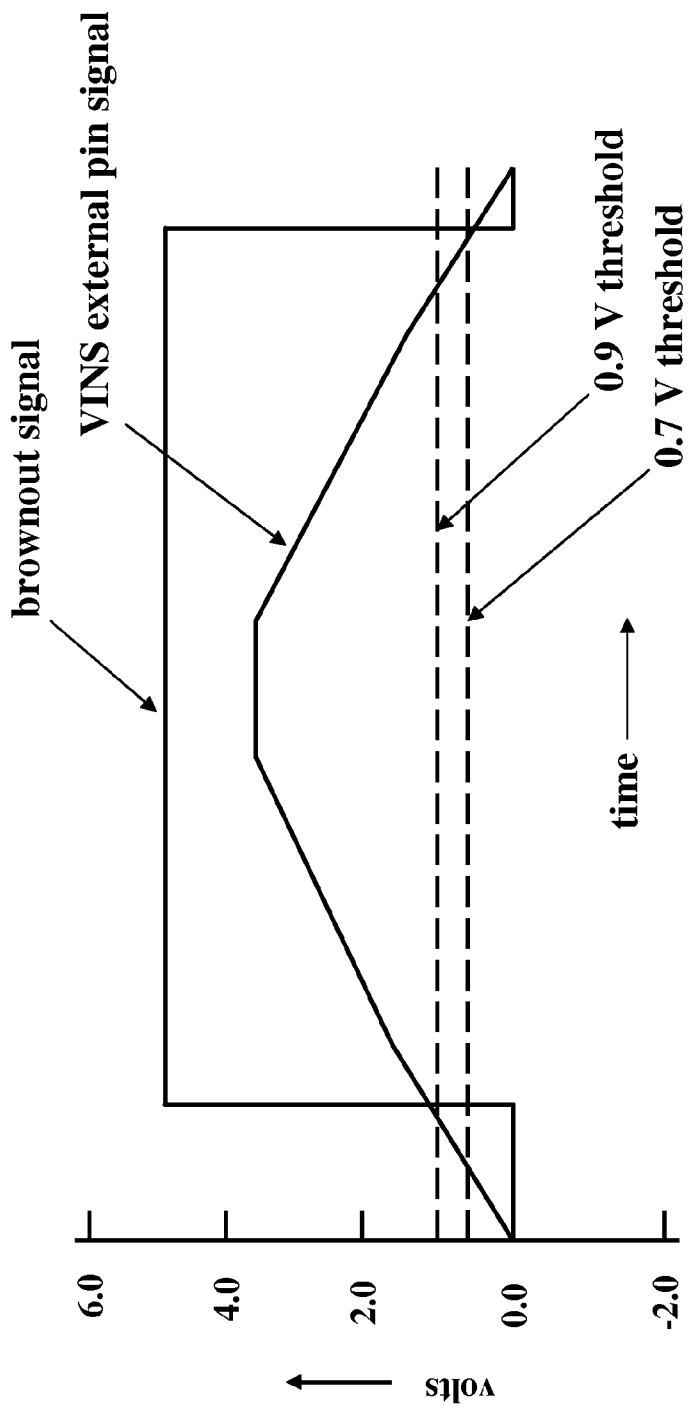
FIG. 23 illustrates exemplary simulation results for a brownout function wherein the brownout function and the line input voltage feedforward function are combined, constructed according to an embodiment.

After combining the brownout function and the line input voltage feedforward function, exemplary simulation results for the brownout function are illustrated in FIG. 23. Illustrated in FIG. 23 are the voltage VINS at the external pin and the corresponding S-R flip-flop $G_{SR}$ brownout signal illustrated in FIG. 20. Also illustrated in FIG. 23 are the 0.7 V and 0.9 V threshold voltages applied to comparators $C_{B1}$ and $C_{B2}$ illustrated in FIG. 18. As illustrated in FIG. 23, it can be observed that when the line input voltage $V_{IN}$ is higher than 120 V (corresponding to an internal voltage VINS of 1.2 V at the external pin), the brownout output of comparator $C_{B1}$ illustrated in FIG. 18 is high. When the line input voltage is lower than 70 V (internally 0.7 V), the brownout signal of comparator $C_{B2}$ is low. It is noted here that when the input voltage $V_{IN}$ is higher than 180 V (internally 1.8 V), the voltage VINS is affected by the line feedforward function due to the resistor $R_{ss}$ inserted between the external pin VINS and transistor $Q_{42}$ that is turned on by operational amplifier $OA_{43}$ that are illustrated in described hereinbelow with reference to FIGS. 31 and 32.

Figure 24:
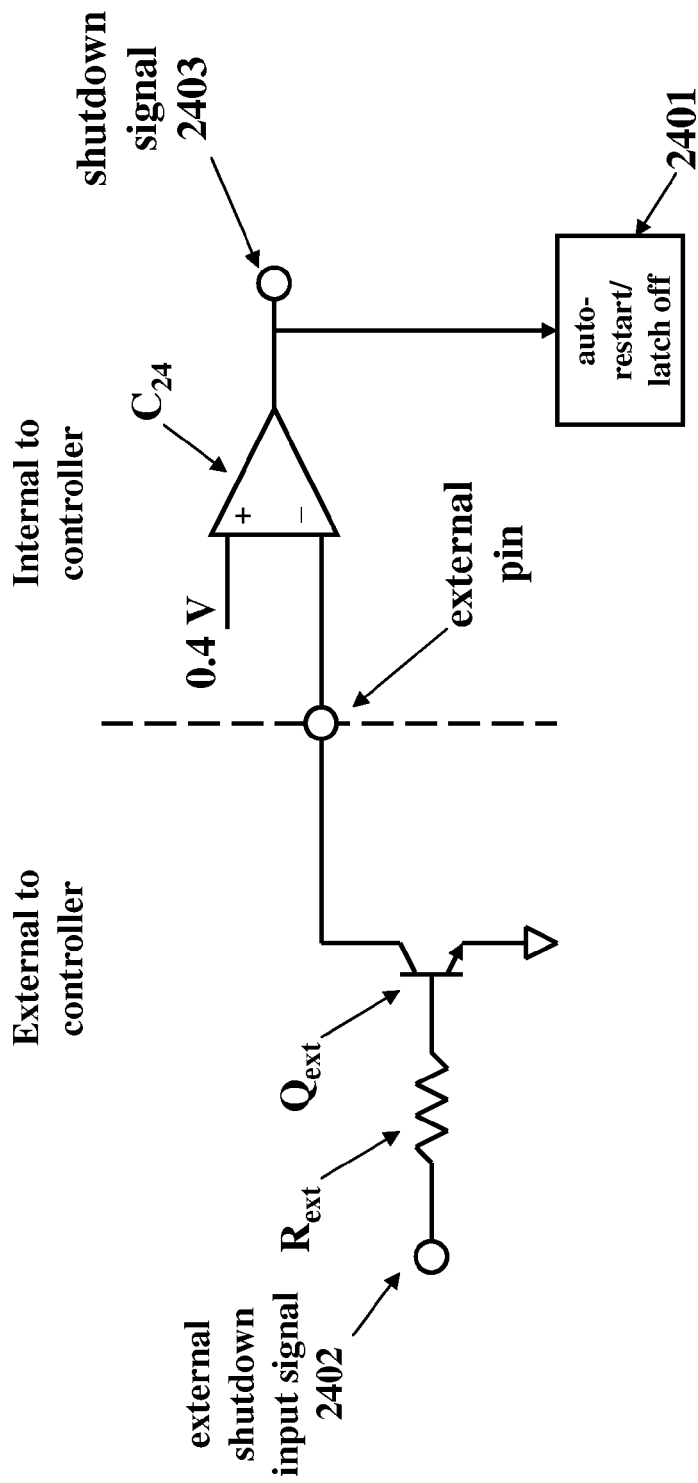
FIG. 24 illustrates a shutdown circuit producing a shutdown signal responsive to an external shutdown input signal produced by an external circuit such as a load coupled to the power converter, constructed according to an embodiment.

Turning now to FIG. 24, illustrated is a shutdown circuit (an external protection enable circuit) producing a shutdown signal 2403 responsive to an external shutdown input signal 2402 produced by an external circuit such as a load coupled to the power converter, constructed according to an embodiment. An external shutdown function is a function that allows an external signal to shut down an internal circuit, such as an internal power converter controller to produce a protective mode of operation, for example a latched or auto-restart mode of operation. The shutdown circuit includes resistor $R_{ext}$ and transistor $Q_{ext}$ coupled to a comparator $C_{24}$ via the external pin. As illustrated in FIG. 24, when the external pin is pulled down in response to the external shutdown input signal to a voltage level lower than 0.4 V, the shutdown signal from comparator $C_{24}$ will be high, and this high signal can be employed to terminate a PWM switching function in a PWM controller or to enable an auto-restart/latch off circuit 2401 to cause the power converter to enter a protective mode of operation. The reference voltage 0.4 V coupled to the noninverting input of comparator $C_{24}$ is selected in view of other functions that are associated with to the external pin as discussed herein.

Figure 25:
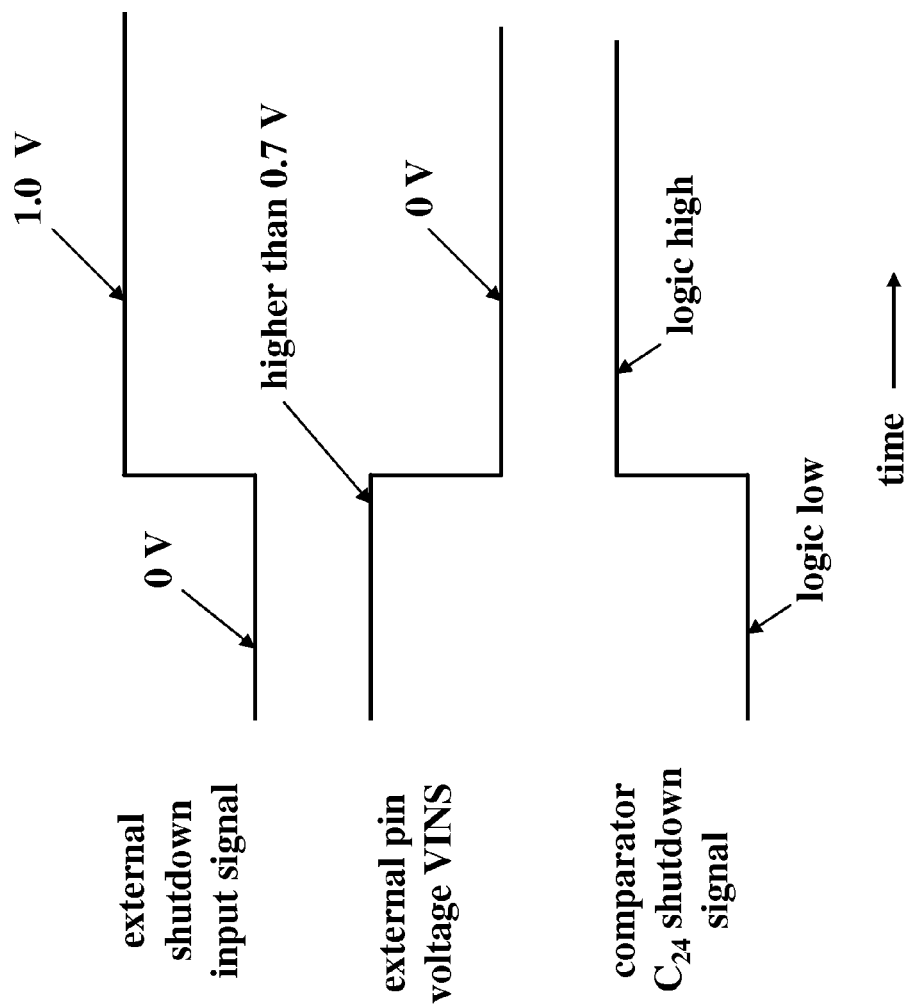
FIG. 25 illustrates simulated waveforms for the external shutdown function circuit illustrated in FIG. 24, constructed according to an embodiment.

Simulated waveforms for the external shutdown function circuit illustrated in FIG. 24 are illustrated in FIG. 25. FIG. 25 illustrates a waveform for the external shutdown signal at the top of the figure, the voltage VINS at the external pin in the middle of the figure, and the output of comparator $C_{24}$ at the bottom of the figure. When the external shutdown signal is asserted, the voltage VINS at the external pin is clamped to local circuit ground by transistor $Q_{ext}$ (illustrated in FIG. 24). The shutdown signal from comparator $C_{24}$ that can be employed to shut down the power converter is set to logic high.

Figure 26:
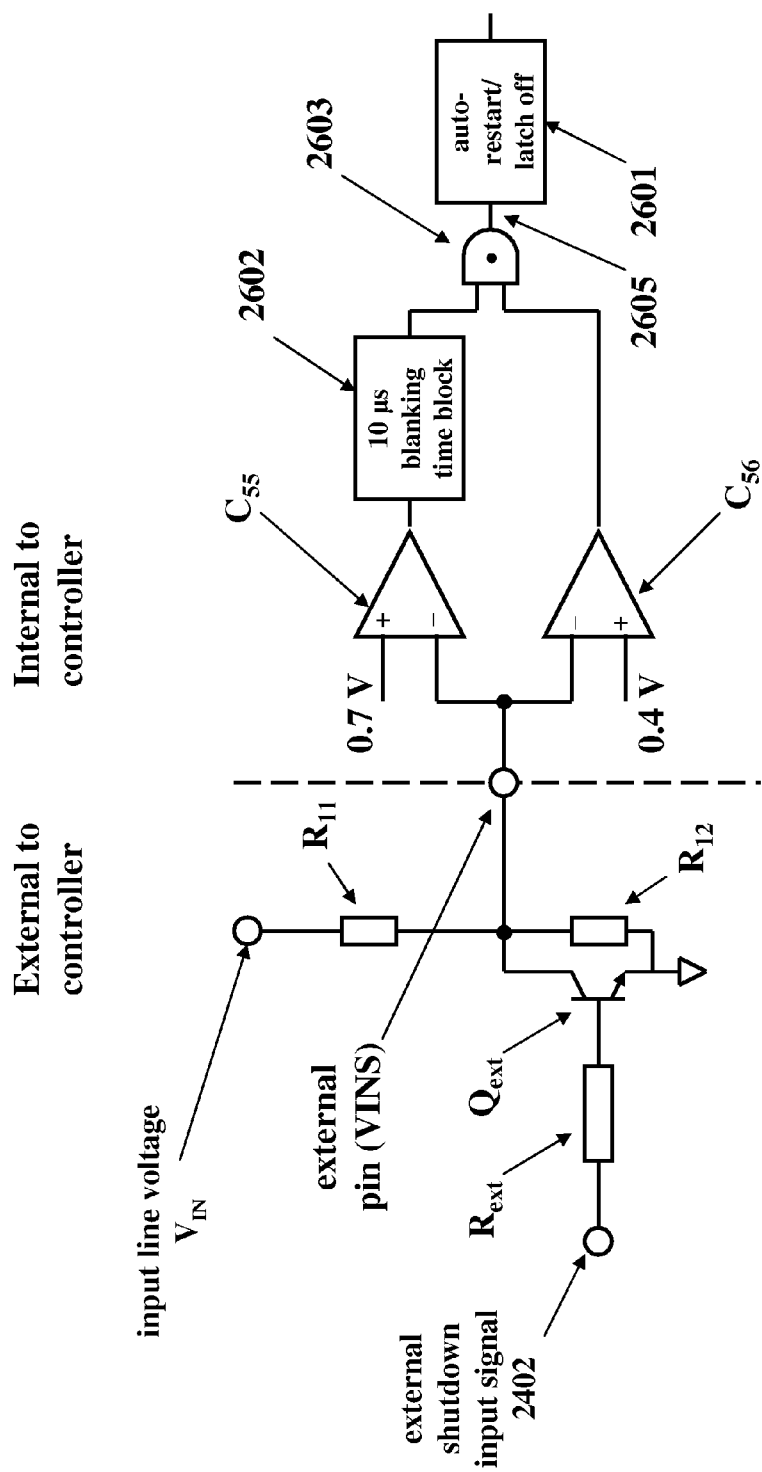
FIG. 26 illustrates an exemplary internal controller circuit providing a protective responsive to and advantageously distinguishing between a low line input voltage and an external shutdown input signal, constructed according to an embodiment.

Turning now to FIG. 26, illustrated is a further exemplary circuit providing an internal controller circuit providing a protective responsive to and advantageously distinguishing between a low line input voltage, i.e., a brownout condition, and an external shutdown input signal 2402. As illustrated in FIG. 26, the external pin is coupled to an external transistor $Q_{ext}$ that it is responsive to an external shutdown input signal employing resistor $R_{ext}$ coupled to its base. Internal to the controller, the external pin is coupled to two comparators, comparator $C_{55}$ and comparator $C_{56}$. One comparator, $C_{55}$, is coupled to a 0.7 V reference voltage, and the other, $C_{56}$, to a 0.4 V reference voltage. Comparator $C_{55}$ is coupled to a blanking time block 2602, which in turn is coupled to an input of AND gate 2603. The other input of AND gate 2603 is coupled to the output of comparator $C_{56}$. The output of AND gate 2603 provides an enable signal 2605 (a "protection signal" as illustrated in FIG. 27) coupled to the output of an auto restart/latch off circuit, 2601.

The voltage at the external pin after assertion of an external shutdown input signal and during a brownout condition advantageously can be distinguished by differing downward slopes of the voltage of the external pin, for example, in the voltage range from 0.7 V to 0.4 V. For a normal ac brownout condition, the downward slope of the voltage of the external pin versus time is relatively slow due to the presence of a typically large bulk capacitor coupled to the dc side of the line input to a power converter. However, upon assertion of an external shutdown input signal, the downward slope (rate of fall) of the voltage of the external pin versus time is more rapid. The blanking time block 2602 provides a blanking time (such as 10 µs) that is added after the 0.7 V comparator and is logically AND'ed with the 0.4 V comparator to distinguish between a brownout condition and assertion of an external shutdown input signal. For a brownout condition, the time to fall from 0.7 V to 0.4 V is generally greater than the exemplary 10 µs blanking delay. Accordingly, shutdown is not triggered for such a brownout condition. If the time to fall from 0.7 V to 0.4 V is less than 10 µs, shutdown is enabled.

Figure 27:
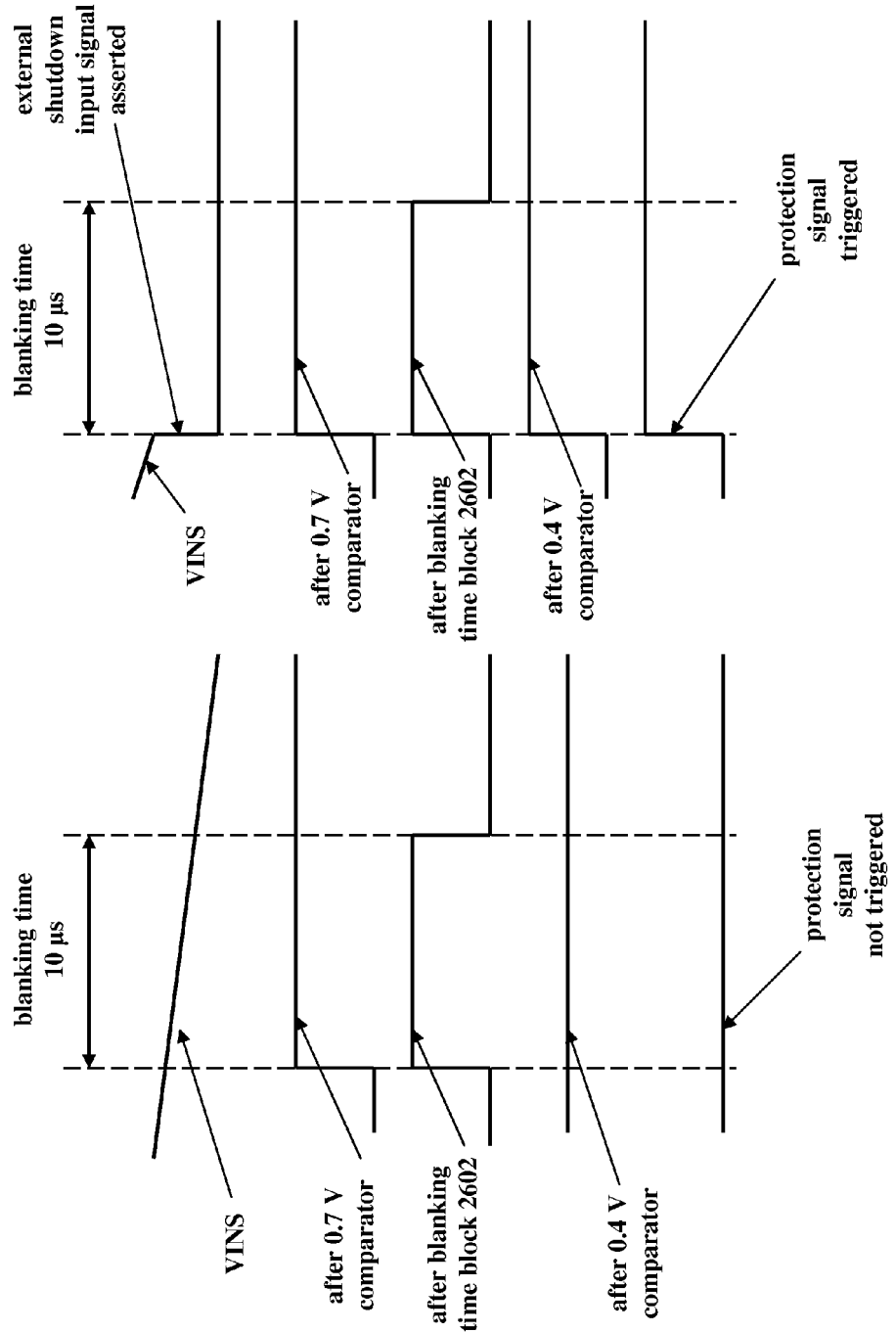
FIG. 27 illustrates waveforms showing protective responses of the circuit illustrated in FIG. 26, constructed according to an embodiment.

Turning now to FIG. 27, illustrated are waveforms showing protective responses (protection signal triggered/not triggered) of the circuit illustrated in FIG. 26. The waveforms illustrated in the left side of the figure demonstrate the absence of a protective response (protection signal not triggered) to a slowly decaying brownout voltage, i.e., a slowly decaying voltage $V_{IN}$ that produces the signal VINS that is insufficient to generate a brownout response on its own. The 0.7 V comparator generates a response, but the 0.4 V comparator does not generate a response.

On the right side of FIG. 27, the external shutdown input signal is asserted ("protection enable") that produces a response from both the 0.7 V comparator and the 0.4 V comparator. The protection signal is triggered after a 10 μs blanking time.

An end customer may desire to know if the PWM controller is operating in a standby mode. Accordingly, a PWM controller includes a standby mode signaling circuit that provides a signal to indicate if it is operating in a standby mode. One solution for a standby mode signaling circuit is to set the voltage of a pin high. An external circuit such as a circuit within the load can determine if the voltage of the pin is higher than a threshold voltage level. If the voltage of the pin is higher than the threshold voltage level, the external circuit determines that the PWM controller is operating in a standby mode.

Figure 28:
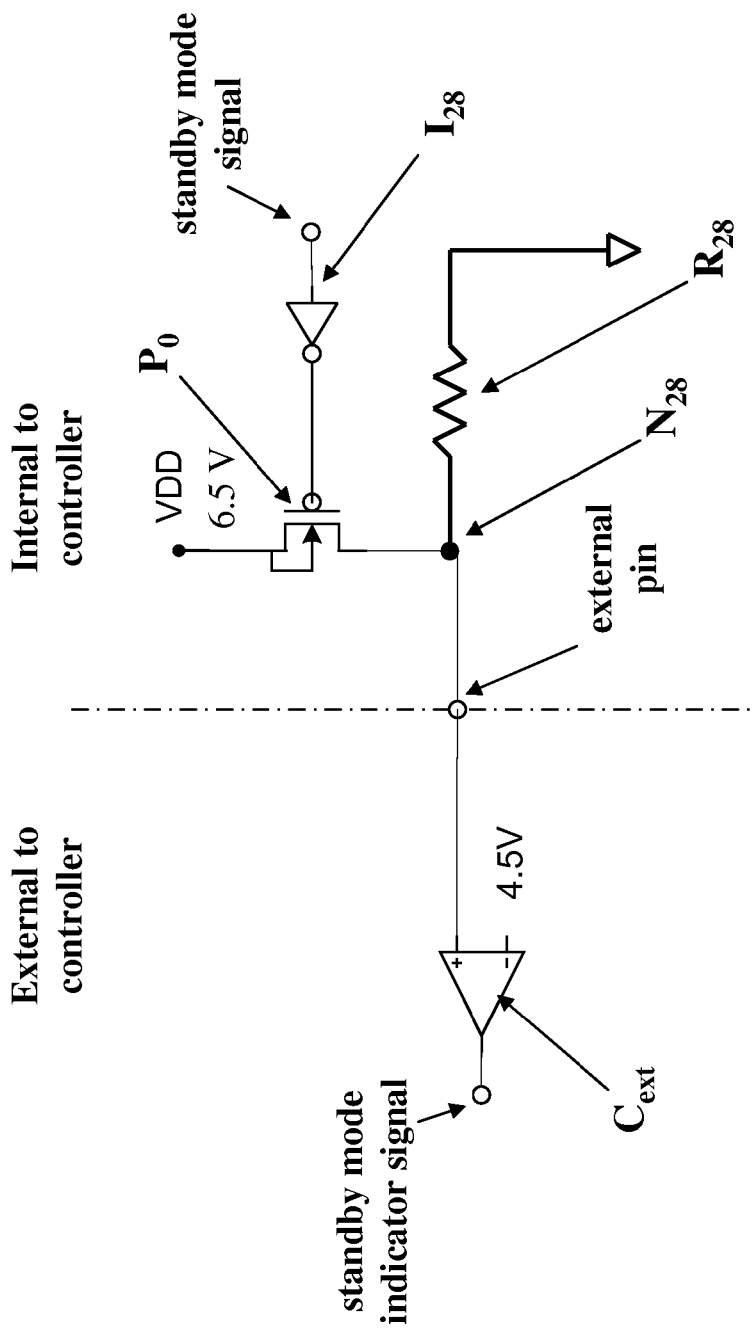
FIG. 28 illustrates a standby mode signaling circuit employing an external pin, wherein a standby mode indicator signal is signaled in response to an internal standby mode signal to an external circuit by means of a voltage on the external pin, constructed according to an embodiment.

Turning now to FIG. 28, illustrated is an embodiment of a standby mode signaling circuit employing an external pin wherein a standby mode indicator signal is signaled in response to an internal standby mode signal by an external circuit, such as a circuit in a load coupled to the power converter, by means of a voltage on the external pin. A PWM controller (not shown) signals a standby mode signal to inverter $I_{28}$ coupled to pnp transistor $P_0$. Transistor $P_0$, in turn, is coupled to 6.5 V bias voltage source VDD and to pull-down resistor $R_{28}$. A circuit node $N_{28}$ between the pull-down resistor $R_{28}$ and transistor $P_0$ is coupled via the external pin to comparator $C_{ext}$ that in turn signals the standby mode indicator signal to the external circuit.

Figure 29:
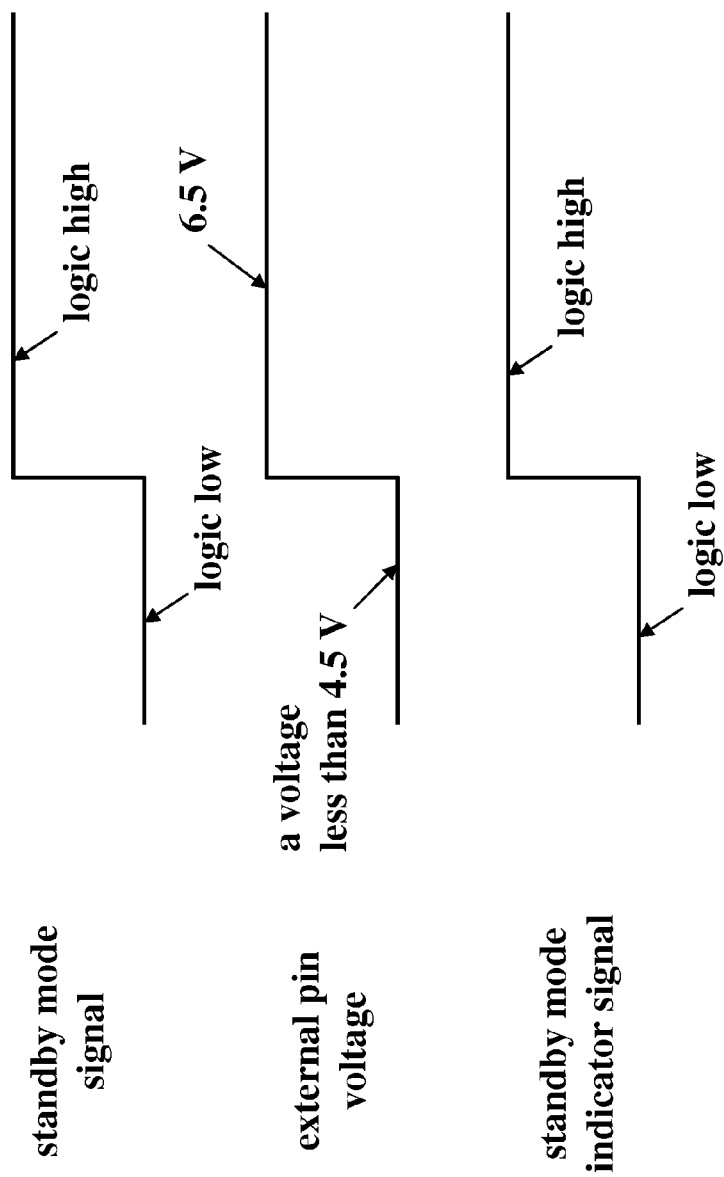
FIG. 29 illustrates waveforms of the internal standby mode signal, the external pin voltage, and the output of the comparator $C_{ext}$ illustrated in FIG. 28, constructed according to an embodiment.

Turning now to FIG. 29, illustrated are waveforms of the internal standby mode signal at the top of the figure, the external pin voltage in the middle of the figure, and the output of comparator $C_{ext}$ (illustrated in FIG. 29) at the bottom of the figure. It can be observed that because the maximum voltage introduced by the input voltage $V_{IN}$ for internal usage is generally 4.0 V (produced at a resistance ratio of 100 to 1 for a 400 V input voltage $V_{IN}$ for an exemplary design), when the internal standby mode signal is asserted high, the voltage at the external pin is pulled up to 6.5 V. A voltage of 6.5 V is detected by the external comparator $C_{ext}$ to signal the standby mode. Thus, when the internal standby mode signal is asserted high, the external comparator $C_{ext}$ output will also become high, indicating that the controller is operating in the standby mode.

Figure 30:
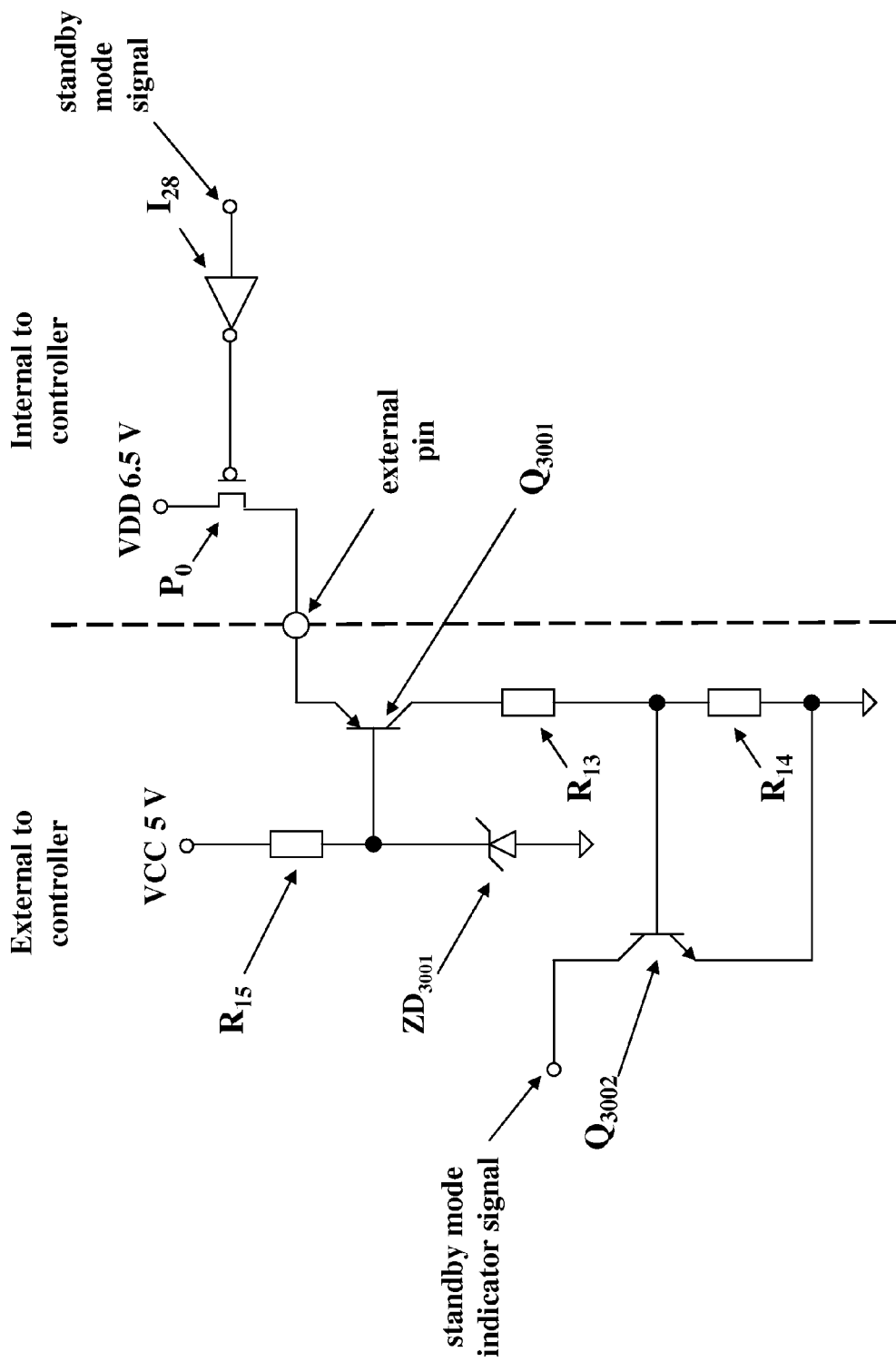
FIG. 30 illustrates a standby mode signaling circuit arrangement employing an external pin wherein a standby mode of a pulse-width modulating controller is signaled to an external circuit by a voltage on the external pin, constructed according to an embodiment.

Turning now to FIG. 30, illustrated is an embodiment of a further standby mode signaling circuit arrangement employing an external pin wherein a standby mode (such as burst mode operation) of a PWM controller is signaled to an external circuit, such as a circuit in a load coupled to the power converter, by a voltage on the external pin. Recall that if the power converter controller is operating in standby/burst mode operation, it may be desirable to turn off such an external circuit. A PWM controller (not shown) signals a standby mode operating condition to inverter $I_{28}$ coupled to transistor $P_0$ that was described with reference to FIG. 28 and that is coupled between the external pin and a bias voltage source such as VDD, 6.5 V.

When the switch $P_0$ is enabled to conduct, the voltage of the external pin is raised to 6.5 V. External to the controller, the emitter of transistor $Q_{3001}$ is coupled to the external pin and its collector is coupled to the resistor divider comprising resistors $R_{13}$ and $R_{14}$. The base of transistor $Q_{3001}$ is coupled to a voltage reference formed with resistor $R_{15}$ and Zener diode $ZD_{3001}$ to provide a base voltage sufficient to enable transistor $Q_{3001}$ to conduct when the voltage of the external pin is raised to 6.5 V. When transistor $Q_{3001}$ is enabled to conduct, transistor $Q_{3002}$ is turned on, clamping the standby mode indicator signal to ground, signaling an external circuit such as a front-end PFC power controller (not shown) to be disabled or to enter a standby mode of operation, advantageously to achieve a low standby power level. Alternatively, a sequence of pulses at a burst frequency running, e.g., from 0 V to 6.5 V, can be produced at the external pin.

Figure 31:
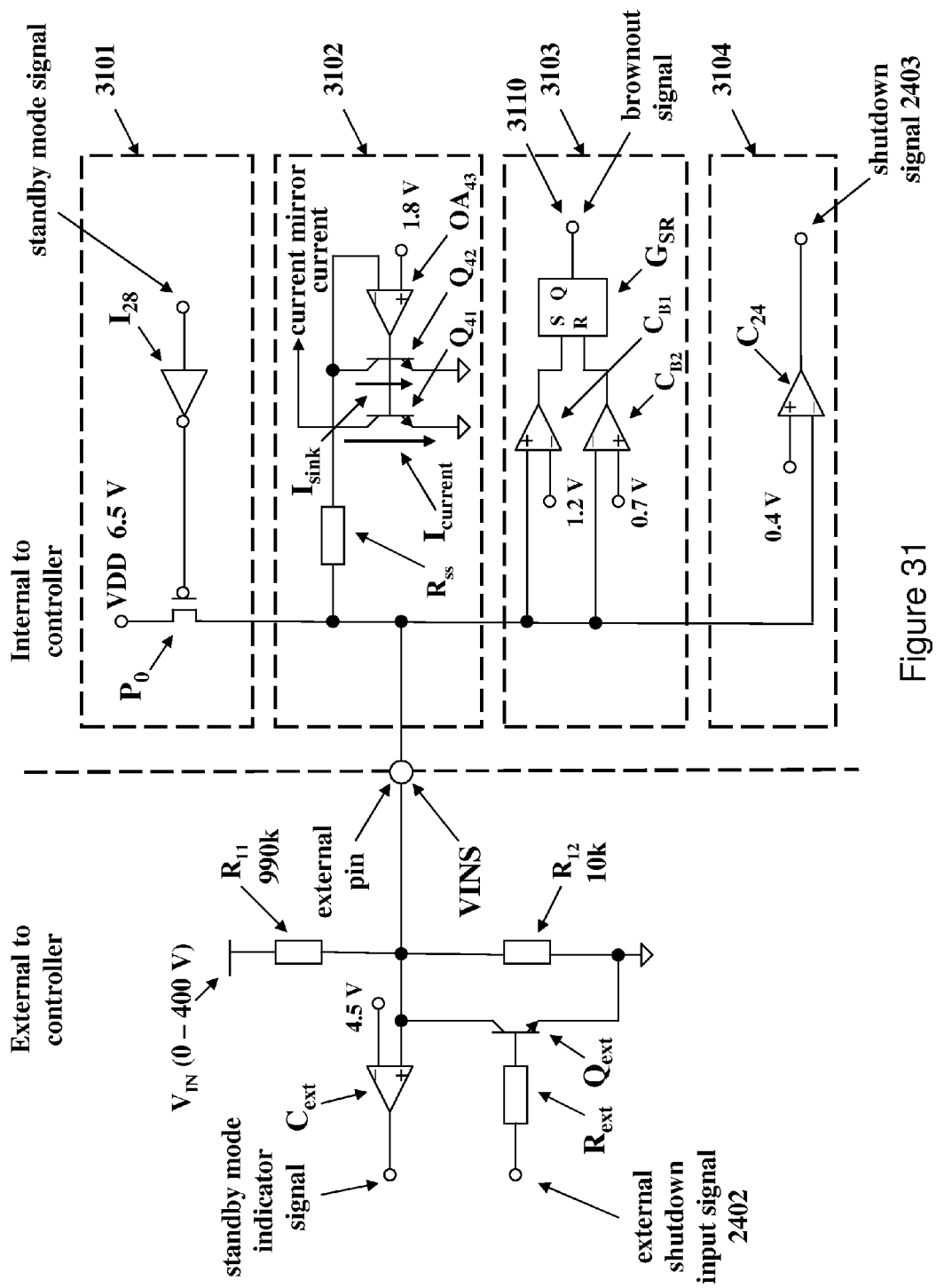
FIG. 31 illustrates a circuit that integrates a standby mode signaling function, an external shutdown signaling function, a line input voltage feedforward function, and a brownout sensing function employing one external pin, constructed according to an embodiment.

Turning now to FIG. 31, illustrated is an embodiment of a circuit that integrates a standby mode signaling function, an external shutdown signaling function (an external protection enable function), a line input voltage feedforward function, and a brownout sensing function employing one external pin, i.e., employing one common circuit node. The circuit illustrated in FIG. 31 includes circuit elements illustrated and described hereinabove with reference to FIGS. 15, 18, 22, 24, 26, 28, and 30. As illustrated in FIG. 31, internal to a controller are a standby mode signaling circuit 3101 responsive to a standby mode signal produced by the controller, an line input voltage feedforward circuit 3102 providing a current from a current mirror signaling a line feedforward function, a brownout signaling circuit 3103 producing a brownout signal, and a shutdown circuit 3104 responsive to an external shutdown signal producing a shutdown signal.

As illustrated further in FIG. 31, resistor $R_{ss}$, operational amplifier $OA_{43}$ coupled to an internal 1.8 V reference, and transistors $Q_{41}$ and $Q_{42}$ provide the line input voltage feedforward function. When the line input voltage $V_{IN}$ is higher than 180 V (corresponding to an internal voltage VINS equal to 1.8 V at the output of the resistor-divider comprising resistors $R_{11}$ and $R_{12}$, i.e., at the external pin), the current $I_{current}$ i.e., the current produced by the current mirror comprising transistors $Q_{41}$ and $Q_{42}$, is positive. The current mirror couples the current mirror current to other blocks in the power converter controller to perform the line input voltage feedforward function. When the line input voltage $V_{IN}$ is lower than 180 V (corresponding to an internal voltage VINS of 1.8 V at the external pin), the current $I_{current}$ will be zero, resulting in no line feedforward signal. Maintaining the ratio of the resistances of resistors $R_{11}$ and $R_{12}$ constant but changing the absolute value of these resistors can enable an end-user to adjust the characteristics of the line feedforward function.

The operational amplifier $OA_{43}$ produces a current when the line input voltage $V_{IN}$ is higher than 180 V, and no current when the line input voltage is lower than 180 V. The design of the line feedforward function preferably should not adversely affect the brownout function.

Figure 32:
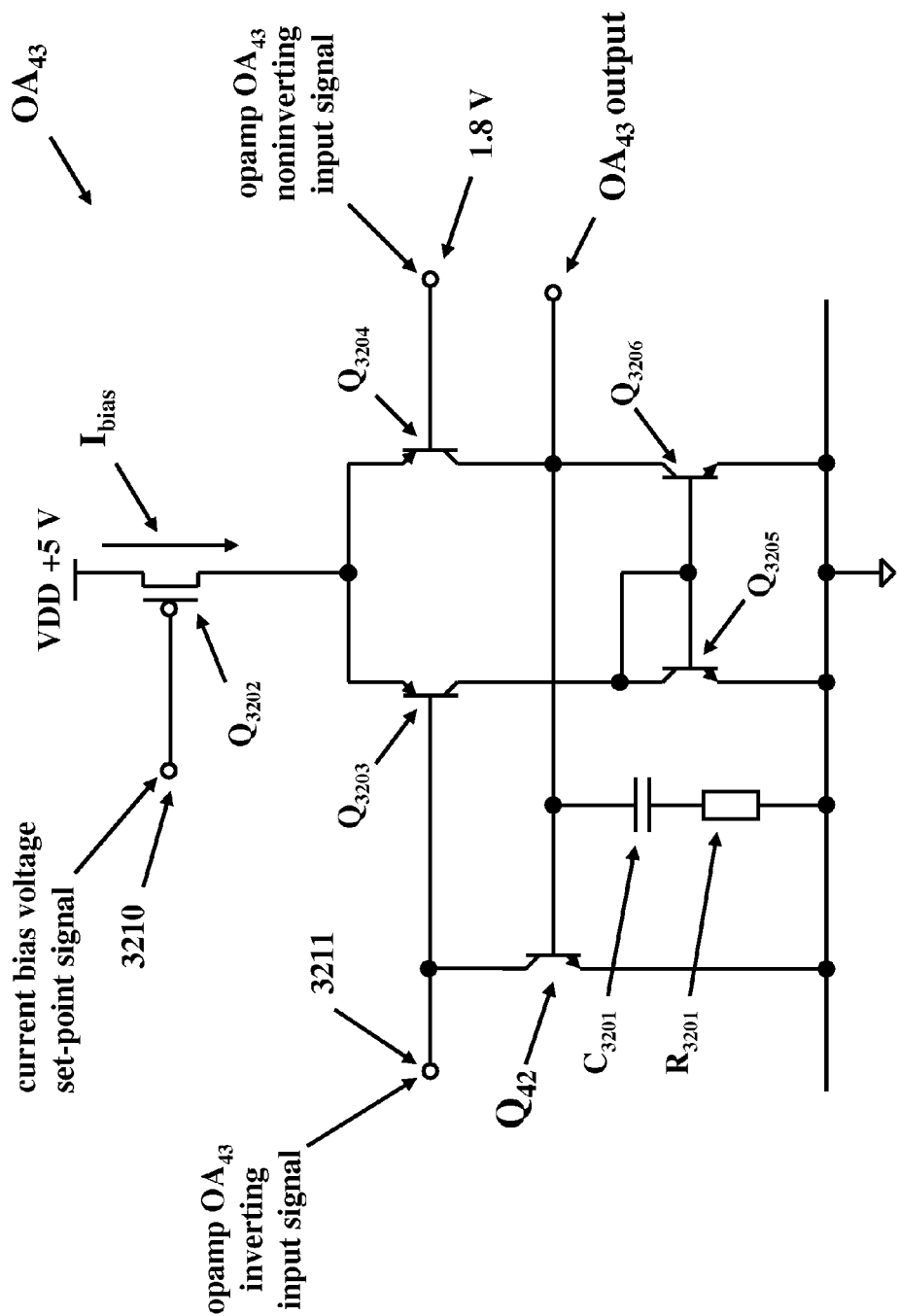
FIG. 32 illustrates a schematic diagram of an exemplary operational amplifier illustrated in FIG. 31 that may be used for the line input voltage feedforward function, constructed according to an embodiment.

Turning now to FIG. 32, illustrated is a schematic diagram of an exemplary operational amplifier $OA_{43}$ illustrated in FIG. 31 including transistor $Q_{42}$, constructed according to an embodiment for the line input voltage feedforward function. The operational amplifier $OA_{43}$ includes pnp transistors $Q_{3203}$ and $Q_{3204}$ coupled to the differential input signal represented by the 1.8 V noninverting input signal and the inverting input signal 3211 that is coupled to the resistor $R_{SS}$ as illustrated in FIG. 31. The collectors of transistors $Q_{3203}$ and $Q_{3204}$ are coupled to the current mirror formed by npn transistors $Q_{3205}$ and $Q_{3206}$. A high-impedance bias current source for transistors $Q_{3403}$ and $Q_{3404}$ is produced by transistor $Q_{3402}$ coupled to the bias input voltage VDD and to a current bias voltage set-point signal 3210. Capacitor $C_{3401}$ and resistor $R_{3401}$ are included to perform a filtering function.

The output of operational amplifier "$OA_{43}$ output" in FIG. 32 is identified in FIG. 31 as "current mirror current."

Figure 33:
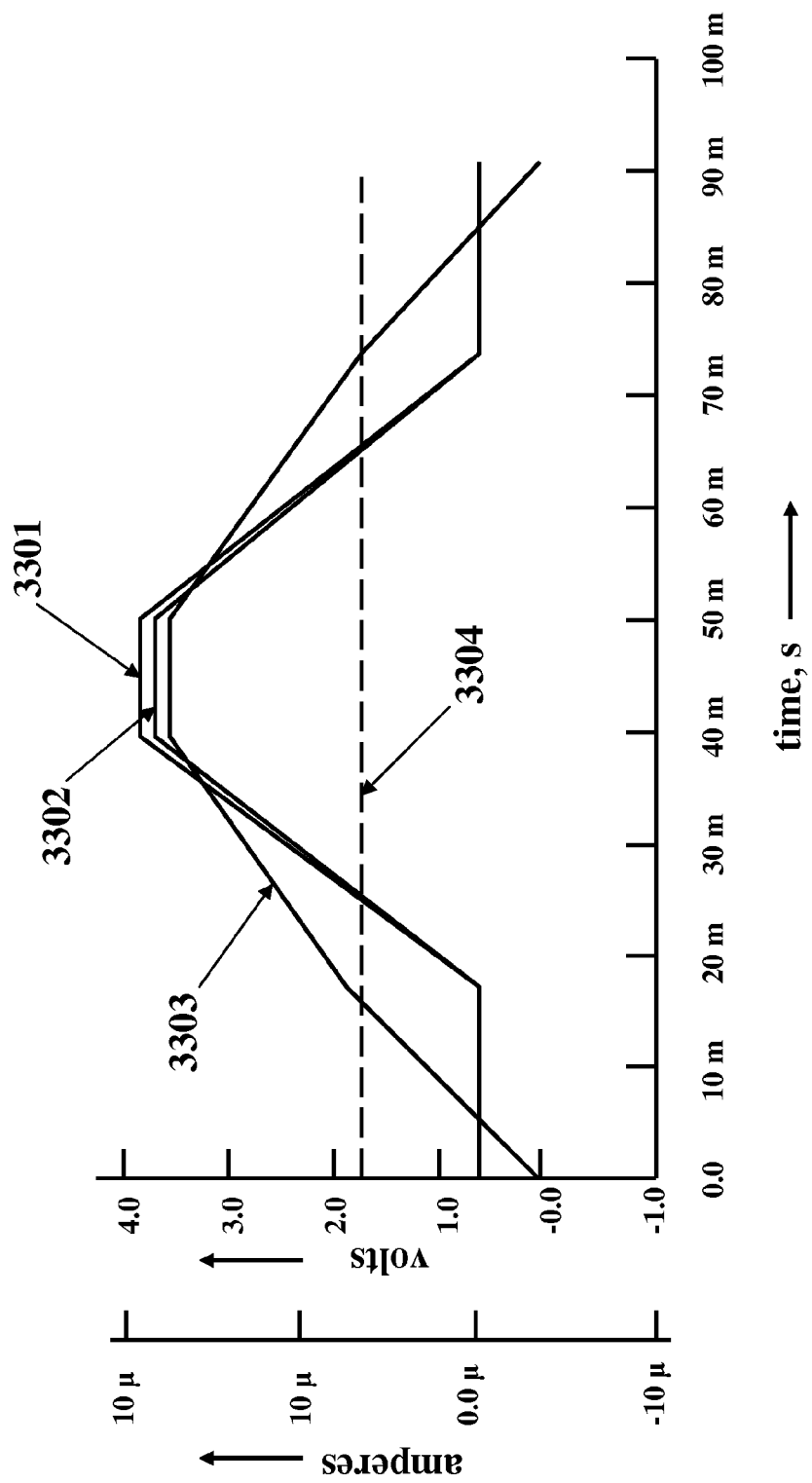
FIG. 33 illustrates waveforms associated with the input voltage feedforward function produced by simulation of an embodiment.

Turning now to FIG. 33, illustrated are waveforms associated with the input voltage feedforward function produced by simulation. Illustrated in FIG. 33 are a waveform 3303 for the voltage VINS at the external pin, a waveform 3302 for the current $I_{current}$ illustrated in FIG. 31, and a waveform 3301 for the current $I_{sink}$, also illustrated in FIG. 31. The 1.8 V threshold voltage is illustrated in the figure with a dashed line. It is evident from the waveforms illustrated in FIG. 33 that when the input voltage $V_{IN}$ is higher than 180 V (internally 1.8 V), a current $I_{current}$ is produced that can be mirrored to another block for the line feedforward response. When the line input voltage is lower than 180 V (internally 1.8 V), no current is produced. When the line input voltage is higher than 180 V (internally 1.8 V), the current $I_{current}$ mirrored to another block increases as line voltage increases. When the line input voltage is higher than 180 V (internally 1.8 V), the current $I_{current}$ also depends on external resistors $R_{11}$ and $R_{12}$ illustrated in FIG. 31. Preferably, the ratio of resistances of these two resistors is fixed, but their absolute value is adjustable. When their resistances are high, the current $I_{current}$ decreases. When it is low, the current $I_{current}$ increases. Accordingly, the line feedforward function solution can be externally adjustable, and an end customer can select different resistance values for a preferred line feedforward functional value.

Thus, only one pin is employed, without limitation, for an external shutdown input signal, a brownout sensing indicator, a line feedforward function, a standby/burst mode signaling function, and a delayed restart timer function, relying on unique characteristics of these functions to use a common circuit node. The voltage range of operation is allocated for different features, relying on a timing constraint to re-use the voltage range to achieve the delayed restart timer function. An exemplary set of ranges for an external pin voltage to provide these functions is:

a) 0 V to 0.4 V, to enable external protection signaled by an external circuit to a power converter, such as an external shutdown input signal;

b) 0.7 V to 0.9 V, to identify a line voltage brownout condition, and produce in response thereto an internal brownout signal;

c) 1.2 V to 4.5 V, for a line voltage feedforward signal (to provide a uniform level of control of maximum power);

d) 4.5 V to 6.5 V, to signal a standby/burst mode indicator signal; and e) 0 V to 4 V, to enable a delayed restart timer function, wherein this voltage range is reused to suspend other features when a power converter is in an over-powered mode. A controller detects a fault/overpowered mode, and may signal an extended restart time interval to an external circuit, such as the load, by alternately switching the voltage of the external pin.

The concept has thus been introduced of employing a threshold voltage in a power converter that is dependent on an input voltage sensed at a circuit node to control entry into and exit from standby or burst mode operation, wherein a current sensing means is employed for a current in a circuit element such as an inductor or a power switch. In an embodiment, the power converter includes a current-sense circuit element configured to produce a current-sense signal dependent on a current in an inductor of the power converter, and a controller is configured to control a duty cycle of a power switch of the power converter. The controller is operable in a burst mode in response to a burst mode signal, and a comparator is configured to assert the burst mode signal when the current-sense signal including an offset dependent on an input voltage to the power converter exceeds a feedback voltage dependent on an output characteristic of the power converter. In an embodiment, the controller terminates the duty cycle of the power switch in response to the current-sense signal exceeding the feedback voltage minus the offset.

In an embodiment, the power converter comprises a flyback circuit topology. In an embodiment, the output characteristic is an output voltage of the power converter. In an embodiment, the power converter is operable in a continuous conduction mode and in a discontinuous conduction mode.

In a further embodiment, a power converter includes a power switch and a resistor-divider network coupled to an input line of the power converter. The resistor-divider network includes a plurality of resistors coupled in series to form a circuit node. A controller is coupled to the power switch and to the circuit node. The controller is configured to shut down the power converter if a voltage of the circuit node is less than a first voltage threshold. The controller is configured to produce an internal brownout signal if the voltage of the circuit node is greater than the first voltage threshold and less then a second voltage threshold. The controller is configured to control the duty cycle of the power switch dependent on a voltage of the circuit node if the voltage of the internal circuit node is greater than the second voltage threshold. And the controller is configured to increase the voltage of the circuit node to a voltage greater than the second voltage threshold if the power converter is operating in a standby mode. In a further embodiment, the controller is configured to disable the power converter in response to assertion of the brownout signal. In a further embodiment, the controller is configured to signal a delayed restart condition of the power converter to an external circuit by alternately perturbing the voltage of the circuit node.

In a further embodiment, a capacitor is coupled to the circuit node, and the controller is further configured to alternately perturb the voltage of the circuit node at a frequency dependent on a capacitance of the capacitor. In an embodiment, the controller further includes a counter to control a delay of the delayed restart condition. In an embodiment, the controller is configured to signal the delayed restart condition in response to assertion of the brownout signal. In an embodiment, the power converter is a switched-mode power converter, and the controller controls a duty cycle of the power switch. In an embodiment, the controller employs hysteresis to produce the brownout signal.

Another exemplary embodiment provides a method of controlling a power converter. The method includes producing a current-sense signal dependent on a current in an inductor of the power converter, controlling a duty cycle of a power switch of the power converter with the current-sense signal, and disabling the duty cycle of the power switch if the current-sense signal exceeds a feedback voltage dependent on an output characteristic of the power converter by an offset dependent on an input voltage to the power converter. In an embodiment, the controller terminates the duty cycle of the power switch in response to the current-sense signal exceeding the feedback voltage minus the offset dependent on an input voltage to the power converter. In an embodiment, the power converter comprises a flyback circuit topology.

Another exemplary embodiment provides a method of controlling a power converter. The method includes coupling a resistor-divider network to an input line of the power converter to produce a signal dependent on an input voltage to the power converter, providing an external circuit node coupled to the signal, disabling the power converter if the signal is less than a first threshold, producing an internal brownout signal to operate the power converter in a standby mode if the signal is greater than the first threshold and less then a second threshold, producing a line voltage feedforward signal to control a duty cycle of the power converter if the signal is greater than the second threshold, and raising the signal by a power converter controller to a level greater than the second threshold if the power converter is operating in a standby mode. In an embodiment, the method further includes signaling a delayed restart condition for the power converter operating in the standby mode to an external circuit by alternately perturbing the signal. In an embodiment, the method further includes employing a counter to control a delay of the delayed restart condition. In and embodiment, the delayed restart condition is signaled in response to assertion of the brownout signal.

Another exemplary embodiment provides a method of controlling a power converter. The method includes producing a current-sense signal dependent on a current in an inductor of the power converter, and disabling a power switch of the power converter when the current-sense signal including an offset dependent on an input voltage to the power converter exceeds a feedback voltage dependent on an output characteristic of the power converter. In an embodiment, the power converter is operable in a continuous conduction mode and a discontinuous conduction mode. In an embodiment, the power converter comprises a flyback circuit topology. In an embodiment, the output characteristic is an output voltage of the power converter.

Although utilization of an external pin and related methods have been described for application to electronic power conversion, it should be understood that other applications of such utilization, such as a power processing circuit in a power amplifier or a motor controller, are contemplated within the broad scope of the invention, and need not be limited to electronic power conversion applications.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A power converter for converting an input voltage to an output voltage, comprising:
   a current-sense circuit element configured to produce a current-sense signal dependent on a current in an inductor of the power converter;
   a controller configured to control a duty cycle of a power switch of the power converter, wherein the controller is operable in a burst mode in response to a burst mode signal;
   a comparator configured to assert the burst mode signal when the current-sense signal, including an offset dependent on the input voltage to the power converter, exceeds a threshold voltage; and
   a feedback voltage adjustment circuit configured to adjust a feedback voltage based on the input voltage to the power converter, wherein the feedback voltage is dependent on an output characteristic of the power converter, wherein the controller terminates the duty cycle of the power switch in response to the current-sense signal exceeding the feedback voltage minus the offset.

2. The power converter of claim 1, further comprising a current sense voltage adjustment circuit to produce the current-sense signal including the offset dependent on the input voltage, the current sense voltage adjustment circuit comprising:
   a transistor having an output coupled to a first input of the comparator, wherein a current through the transistor is related to the input voltage, and
   a resistor coupled between the threshold voltage and the first input of the comparator.

3. The power converter as claimed in claim 1, wherein the power converter comprises a flyback circuit topology.

4. The power converter of claim 1, wherein the feedback voltage adjustment circuit comprises:
   a voltage buffer coupled to the feedback voltage;
   a resistor having a first end coupled to an output of the voltage buffer; and
   a transistor having an output coupled to a second end of the resistor to produce an adjusted feedback voltage at the output of the transistor, wherein a current through the transistor is related to the input voltage.

5. The power converter as claimed in claim 1, wherein the power converter is operable in a continuous conduction mode and a discontinuous conduction mode.

6. A power converter, comprising:
   a power switch;
   a resistor-divider network coupled to an input line of the power converter, the resistor-divider network comprising a plurality of resistors coupled in series to form a circuit node; and
   a controller coupled to the power switch and to the circuit node, wherein the controller is configured to
       shut down the power converter if a voltage of the circuit node is less than a first voltage threshold,
       produce an internal brownout signal if the voltage of the circuit node is greater than the first voltage threshold and less than a second voltage threshold,
       control a duty cycle of the power switch dependent on the voltage of the circuit node if the voltage of the circuit node is greater than the second voltage threshold, and wherein the controller is further configured to increase the voltage of the circuit node to a voltage greater than the second voltage threshold if the power converter is operating in a standby mode.

7. The power converter as claimed in claim 6, wherein the controller is further configured to disable the power converter in response to assertion of the brownout signal.

8. The power converter as claimed in claim 6, wherein the controller is further configured to signal a delayed restart condition of the power converter to an external circuit by alternately perturbing the voltage of the circuit node.

9. The power converter as claimed in claim 8, further including a capacitor coupled to the circuit node, and wherein the controller is further configured to alternately perturb the voltage of the circuit node at a frequency dependent on a capacitance of the capacitor.

10. The power converter as claimed in claim 8, wherein the controller further includes a counter to control a delay of the delayed restart condition.

11. The power converter as claimed in claim 8, wherein the controller is configured to signal the delayed restart condition in response to assertion of the brownout signal.

12. The power converter as claimed in claim 6, wherein the power converter is a switched-mode power converter, and the controller controls the duty cycle of the power switch.

13. The power converter as claimed in claim 6, wherein the controller employs hysteresis to produce the brownout signal.

14. A method of controlling a power converter that converts an input voltage to an output voltage, the method comprising:

producing a current-sense signal dependent on a current in an inductor of the power converter;

controlling a duty cycle of a power switch of the power converter with the current-sense signal; and disabling the duty cycle of the power switch if the current-sense signal exceeds a threshold voltage dependent on a first threshold and on the input voltage of the power converter, wherein a controller terminates the duty cycle of the power switch in response to an adjusted current-sense signal exceeding a feedback voltage minus an offset dependent on the input voltage to the power converter.

15. The method as claimed in claim 14, wherein the power converter comprises a flyback circuit topology.

16. A method of controlling a power converter, the method comprising:

coupling a resistor-divider network to an input line of the power converter to produce a signal dependent on an input voltage to the power converter;

providing an external circuit node coupled to the signal;

disabling the power converter if the signal is less than a first threshold;

producing an internal brownout signal to operate the power converter in a standby mode if the signal is greater than the first threshold and less than a second threshold;

producing a line voltage feedforward signal to control a duty cycle of the power converter if the signal is greater than the second threshold; and raising the signal by a power converter controller to a level greater than the second threshold if the power converter is operating in a standby mode.

17. The method as claimed in claim 16, further comprising signaling a delayed restart condition for the power converter operating in the standby mode to an external circuit by alternately perturbing the signal.

18. The method as claimed in claim 17, further comprising employing a counter to control a delay of the delayed restart condition.

19. The method as claimed in claim 17, wherein the delayed restart condition is signaled in response to assertion of the brownout signal.

20. A method of controlling a power converter that converts an input voltage to an output voltage, the method comprising:

producing a current-sense signal dependent on a current in an inductor of the power converter; and terminating a duty cycle of a power switch of the power converter when the current-sense signal exceeds a feedback voltage minus an offset, wherein the feedback voltage is dependent on an output characteristic of the power converter, and the offset is dependent on an input voltage to the power converter; and disabling the power switch of the power converter if the current-sense signal exceeds a threshold voltage dependent on a first threshold and on the input voltage of the power converter.

21. The method as claimed in claim 20, wherein the power converter is operable in a continuous conduction mode and a discontinuous conduction mode.

22. The method as claimed in claim 20, wherein the power converter comprises a flyback circuit topology.

23. The method as claimed in claim 20, wherein the output characteristic is an output voltage of the power converter.

* * * * *